(12) United States Patent
Cramer

(10) Patent No.: US 11,580,881 B2
(45) Date of Patent: *Feb. 14, 2023

(54) SHAPE-MATRIX GEOMETRIC INSTRUMENT

(71) Applicant: Shape Matrix Geometric Instruments, LLC, Brooklyn, NY (US)

(72) Inventor: Jonathan Cramer, Walton, NY (US)

(73) Assignee: Shape Matrix Geometric Instruments, LLC, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/105,897

(22) Filed: Nov. 27, 2020

(65) Prior Publication Data

US 2021/0082316 A1    Mar. 18, 2021

Related U.S. Application Data

(63) Continuation of application No. 16/228,762, filed on Dec. 21, 2018, now Pat. No. 10,885,810, which is a continuation of application No. 14/794,923, filed on Jul. 9, 2015, now Pat. No. 10,204,530.

(Continued)

(51) Int. Cl.
| | |
|---|---|
| *G09B 23/04* | (2006.01) |
| *A63H 33/04* | (2006.01) |

(Continued)

(52) U.S. Cl.
CPC ............ *G09B 23/04* (2013.01); *A63F 9/1204* (2013.01); *A63H 33/04* (2013.01); *G09B 1/32* (2013.01);

(Continued)

(58) Field of Classification Search
CPC ........ G09B 23/04; G09B 23/02; G09B 23/06; G09B 1/32; G09B 19/00; G09B 5/02; A63H 33/04; A63F 9/12
See application file for complete search history.

(56) References Cited

U.S. PATENT DOCUMENTS

| | | | | |
|---|---|---|---|---|
| 4,513,970 A | * | 4/1985 | Opresco | A63F 9/34 273/153 S |
| 4,595,907 A | * | 6/1986 | Huffman | H04J 3/18 370/476 |

(Continued)

OTHER PUBLICATIONS

Lin, P., et al., Graphical Passwords Using Images with Random Tracks of Geometric Shapes; published in Congress on Image and Signal Processing, 2008, CISP '08, Date of Conference: May 27-30, 2008, Date Added to online IEEE Xplore: Jul. 16, 2008 (Year: 2008).*

(Continued)

*Primary Examiner* — Eddy Saint-Vil
(74) *Attorney, Agent, or Firm* — Ronald D. Slusky; Stephen R. Otis

(57) ABSTRACT

Shape-matrix geometric instruments having numerous applications including, but not limited to, anti-counterfeiting, graphical passwording, games, and geometry education. A shape-matrix geometric instrument is a manufacture and/or a method whose design is based on a shape-matrix that, in turn comprises a set of building blocks that are N-dimensional polytopes. Corner shapes are positioned in or near the interior corner spaces of at least ones of the shape-matrix building blocks. At least ones of the corner shapes differ from others in at least one property or aspect including, for example, geometric shape, orientation within the building block, and one or more surface "finishes," such as color, shading, cross-hatching or real or apparent texture.

23 Claims, 19 Drawing Sheets
(18 of 19 Drawing Sheet(s) Filed in Color)

Related U.S. Application Data

(60) Provisional application No. 62/023,290, filed on Jul. 11, 2014.

(51) Int. Cl.
*A63F 9/12* (2006.01)
*G09B 1/32* (2006.01)
*G09B 19/00* (2006.01)
*G09B 5/02* (2006.01)
*G09B 23/02* (2006.01)
*G09B 23/06* (2006.01)

(52) U.S. Cl.
CPC ............... *G09B 5/02* (2013.01); *G09B 19/00* (2013.01); *G09B 23/02* (2013.01); *G09B 23/06* (2013.01)

(56) References Cited

U.S. PATENT DOCUMENTS

| | | | | |
|---|---|---|---|---|
| 6,062,978 A | * | 5/2000 | Martino | A63F 9/24 463/9 |
| 6,217,023 B1 | * | 4/2001 | Kremer | A63F 9/0834 273/153 R |
| 6,219,421 B1 | * | 4/2001 | Backal | H04L 9/0827 380/28 |
| 9,264,417 B2 | * | 2/2016 | Yu | G06F 21/46 |
| 2010/0322485 A1 | * | 12/2010 | Riddiford | G06F 3/0481 726/2 |
| 2011/0040977 A1 | * | 2/2011 | Farrugia | H04L 9/0662 713/181 |
| 2014/0189819 A1 | * | 7/2014 | Grimaud | H04L 67/10 726/5 |

OTHER PUBLICATIONS

Loukhaoukha, K., et al., A Secure Image Encryption Algorithm Based on Rubik's Cube Principle; published in Journal of Electrical and Computer Engineering, vol. 2012 (2012) (Year: 2012).*

Zhu, B., et al., Captcha as Graphical Passwords—A New Security Primitive Based on Hard AI Problems; published in IEEE Transactions on Information Forensics and Security, vol. 9, Issue. 6, Jun. 2014 (Year: 2014).*

* cited by examiner

SHAPE-MATRIX GEOMETRIC INSTRUMENT

CROSS-REFERENCE TO RELATED APPLICATION

This application is a continuation of U.S. application Ser. No. 16/228,762 filed Dec. 21, 2018, which is a continuation of U.S. application Ser. No. 14/794,923 filed Jul. 9, 2015, which claims the benefit of U.S. Provisional Application 62/023,290 filed Jul. 11, 2014 (the "Provisional"). The disclosure of the Provisional is hereby incorporated by reference as though fully set forth herein.

SUMMARY

The present invention is directed to what I refer to as a shape-matrix geometric instrument—a manufacture and/or a method whose design is based on a construct that I refer to as a shape-matrix.

As described herein, shape-matrix geometric instruments have numerous applications including, but not limited to, anti-counterfeiting, graphical passwording, games, and geometry education.

A "shape-matrix" comprises a set of N-dimensional polytopes, hereafter referred to as "building blocks". In the embodiments disclosed herein, N=2 or N=3, and the building blocks are regular polytopes. Preferably, the N-dimensional building blocks are of a type that can be tessellated in N-space. The two-dimensional building blocks are illustratively squares and the three-dimensional building blocks are illustratively cubes. An N-dimensional shape-matrix comprises a plurality of building blocks, with up to $2^N$ building blocks having a common vertex when tessellated. Those building blocks are referred to herein as the "core" building blocks, their common vertex is referred to as the shape-matrix vertex. Positioned in or near the interior corner spaces of at least ones of the shape-matrix building blocks are respective corner shapes at least some of which differ from others in at least one property or aspect including, for example, geometric shape, orientation within the building block, and one or more surface "finishes," such as color, shading, cross-hatching or real or apparent texture. The corner shapes that surround the shape-matrix vertex form different shape nuggets associated with respective different combinations of orientations, or "rotations" of the building blocks.

In particular embodiments, the corner shapes are formed from so-called mother shapes. The corner shapes formed from a given mother shape are the portions of the mother shape that would fall within the interior of the core building blocks when the mother shape is positioned to include the shape-matrix vertex within its interior. Another way to say this is that among the various shape nuggets that are formed by the corner shapes that surround the common vertex, certain of those shape nuggets are the mother shapes. One or more of the mother shapes may differ from the other mother shapes in at least any one or more of the properties mentioned above in connection with the corner shapes—geometric shape, orientation (vis-à-vis the shape-matrix as a whole), and finish, for example—as well as the location of the shape-matrix vertex within the mother shape. The mother shapes may or may not be centered on the shape-matrix vertex. Not centering a mother shape on the shape-matrix vertex typically gives rise to a larger number of unique shape nuggets. Particular ones of the mother shapes are shapes formally named in the science of geometry, such as square, triangle, circle (for two-dimensional shape-matrices) and such as sphere, torus, cube, cone, ovoid, tetrahedron and cylinder (for three-dimensional shape-matrices.

A shape-matrix geometric instrument can be implemented in either two dimensions or three dimensions.

For example, a two-dimensional implementation of a two-dimensional shape-matrix geometric instrument may comprise a set of physical tiles each having corner shapes depicted thereon. A three-dimensional implementation of a three-dimensional shape-matrix geometric instrument may comprise, for example, a set of physical three-dimensional polyhedrons corresponding to the constituent polyhedrons of the shape-matrix. Such an implementation might be, for example, a set of blocks formed from transparent plastic or other material with the various corner shapes embedded therein. In another implementation, each block might be an open framework of joined edges. Yet other implementations may just comprise for example, a set of corner shapes formed from mother shapes in the manner described above. A two-dimensional implementation of a three-dimensional shape-matrix geometric instrument may comprise, for example, a two-dimensional graphic medium, such as paper or a computer screen, on which a three-dimensional shape-matrix or at least ones of its components (e.g., a shape nugget) are depicted using perspective, shading and so forth.

When a two-dimensional implementation of a three-dimensional shape-matrix geometric instrument presents the shape-matrix on a computer screen, the shape-matrix geometric instrument may include software that allows a user to interact with the shape-matrix geometric instrument. A user can, for example, be provided with the ability to create shape matrices as well as to manipulate user-created and/or pre-created shape-matrices and/or their components on the screen. Such manipulations might include the ability of a user to manipulate the user's orientation or "point of view" vis-à-vis the shape-matrix and/or its components, as well as to manipulate individual components, such as individual building blocks of a shape-matrix in to order to create different shape nuggets. Various such implementations may not show the cube edges but, rather, just the various corner shapes" floating in air" so to speak, albeit each still being fixed at or near a corner of an inviolate cubic space.

DRAWINGS

The patent or application file contains at least one drawing executed in color. Copies of this patent or patent application publication with color drawing(s) will be provided by the Office upon request and payment of the necessary fee.

FIG. 8 shows one of a set of cubes of a three-dimensional implementation of a shape-matrix geometric instrument, wherein the cubes are solid transparent blocks of plastic or the like;

DETAILED DESCRIPTION

This Detailed Description and accompanying drawing begins by explaining the shape-matrix construct, followed by a discussion of some variations and extensions thereof. We then talk about shape-matrix geometric instruments—which are real-life manufactures and methods that are based on the shape-matrix construct—and then about various shape-matrix geometric instrument applications and uses. This is followed by a disclosure of a software design of a shape-matrix geometric instrument implemented as part of a smartphone app and then some further observations.

Basic Shape-Matrix Construct

The basic shape-matrix construct may be understood from a consideration of a three-dimensional shape-matrix.

Figure 1:
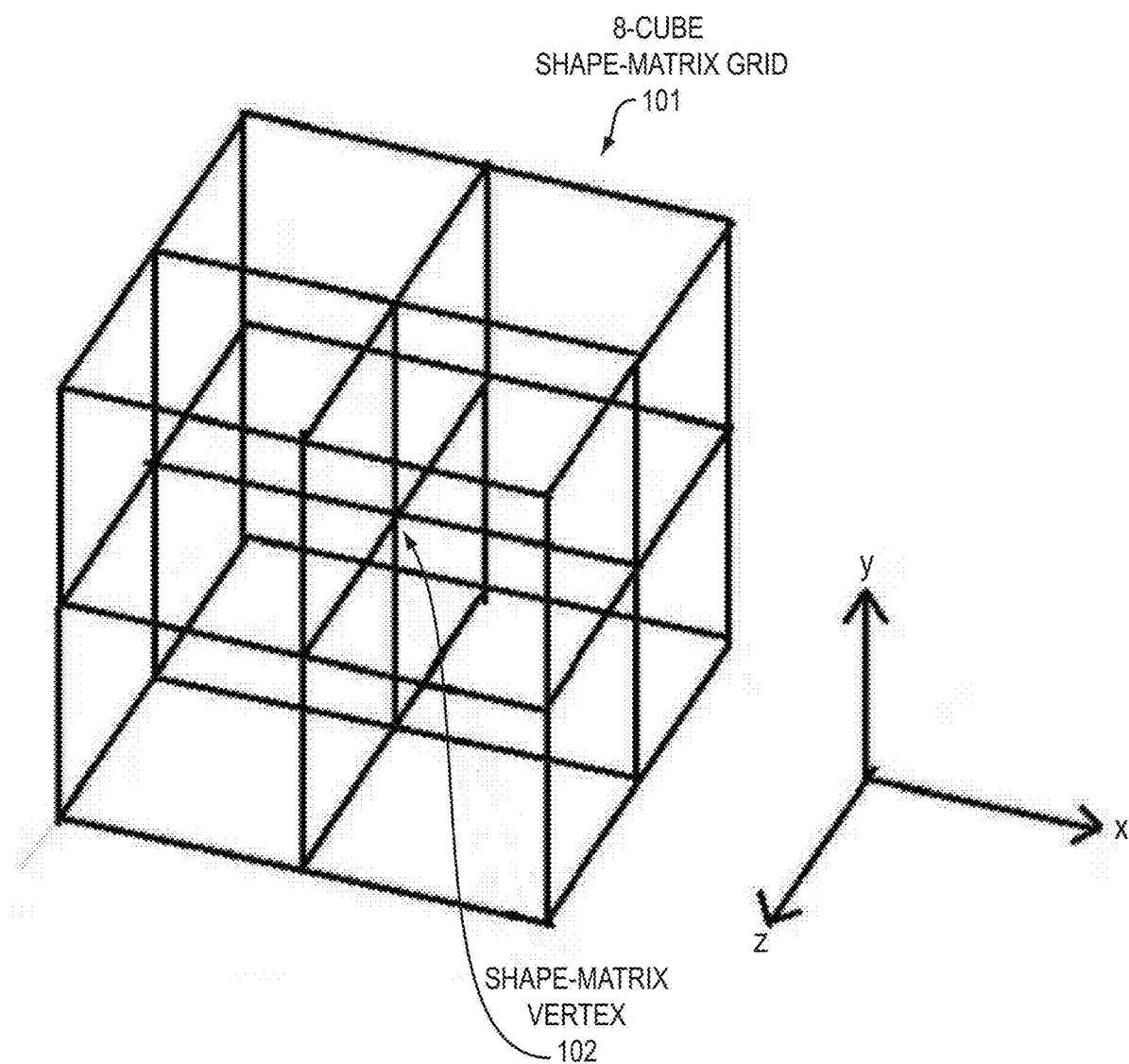
FIGS. 1-5 illustrate various aspects of the shape-matrix construct.

FIG. 1 shows a set of $2^N$ N-dimensional regular polytopes (hereinafter "building blocks") of a type that can be tessellated in N-space—that is able to be arranged in N-space with no overlaps and no gaps. Illustratively N=3 and the building blocks are cubes. There are thus 8 building blocks illustratively tessellated in a 2×2 array. This is called the shape-matrix grid. The point where a corner, or vertex, from each of the eight building blocks meet at a point of the shape-matrix grid 101 is referred to as the shape-matrix vertex 102.

Figure 2:
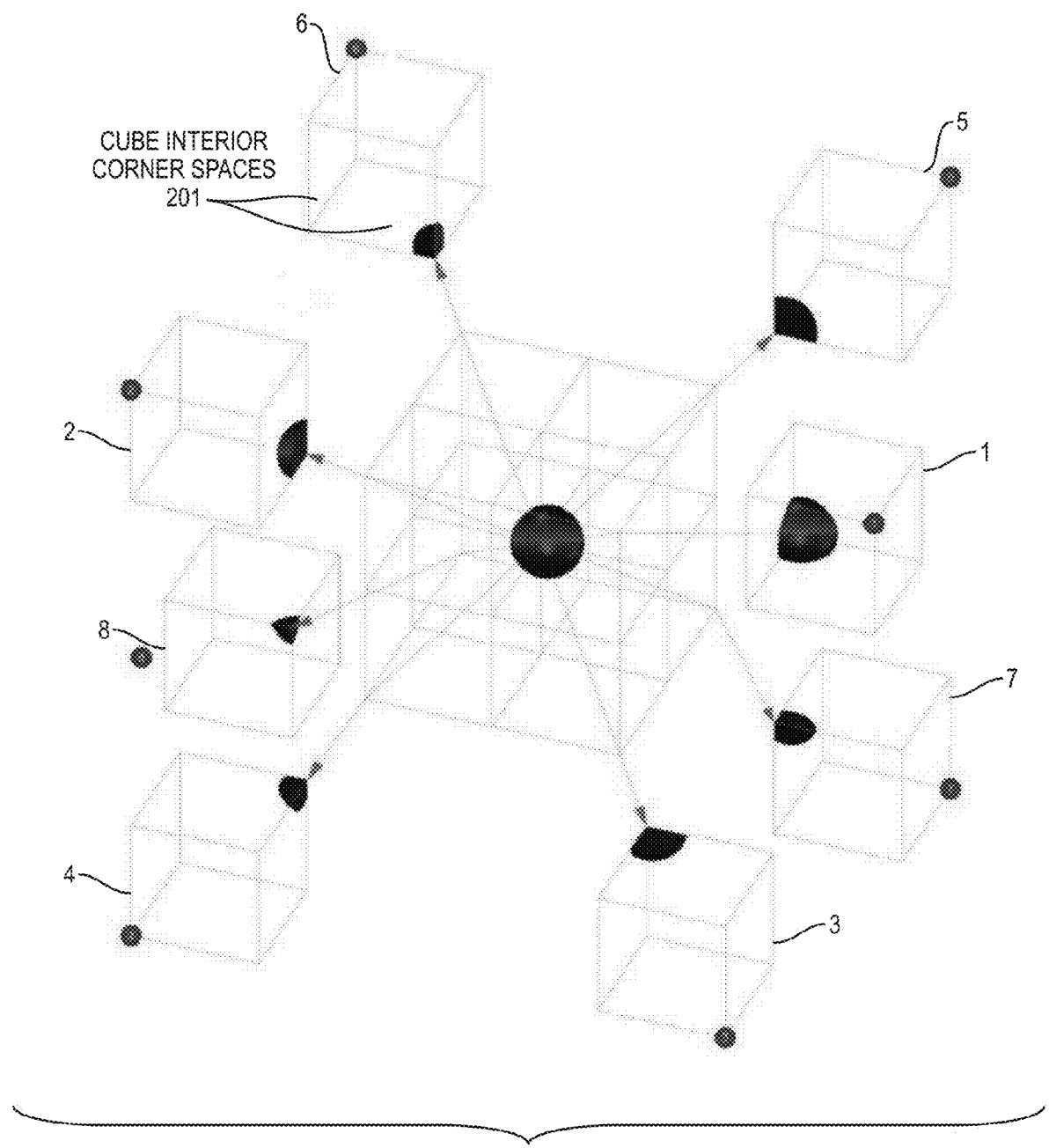

Positioned in or near the interior corner spaces of at least ones of the shape-matrix building blocks are respective corner shapes at least some of which differ from others in at least one aspect including, for example, geometric shape, orientation within the building block, and surface "finish," such as its color, shading, cross-hatching or real or apparent texture. In this particular example, the corner shapes are formed from so-called mother shapes. FIG. 2 shows the 8-building-block shape-matrix grid with a three-dimensional mother shape—illustratively a black sphere—positioned in such a way that the shape-matrix vertex is in the interior of the mother shape and in such a way that a section of the mother shape falls in or near an interior corner space of a respective one of the eight building blocks—referred to herein as being positioned "over" the shape-matrix vertex. FIG. 2 shows, among other things, cube interior corner spaces 201. Each such section of the mother shape is a different one of the shape-matrix's corner shapes each positioned within a respective one of the building blocks.

The center of the mother shape does not have to be coincident with the shape-matrix vertex, although it could be. The eight corner shapes thus may or may not be identical. For example, they will be identical for mother shapes in the form of spheres or regular polyhedrons, wherein the mother shape center is coincident with the shape-matrix vertex. But they would not be identical if the mother shape's center was not coincident with the shape-matrix vertex. Indeed, in the case of FIG. 2, they are not identical. Having the center of a regular mother shape be not coincident with the shape-matrix vertex creates more non-identical corner shapes and thus greatly increases the number of different so-called "shape nuggets" (discussed below) of a given shape-matrix.

FIG. 2 shows a displaced version of each building block of the shape-matrix grid itself, the representations being labeled 1, 2, 3, 4, 5, 6, 7 and 8. One can see within each displaced version the respective corner shape derived from the spherical mother shape.

Figure 3:
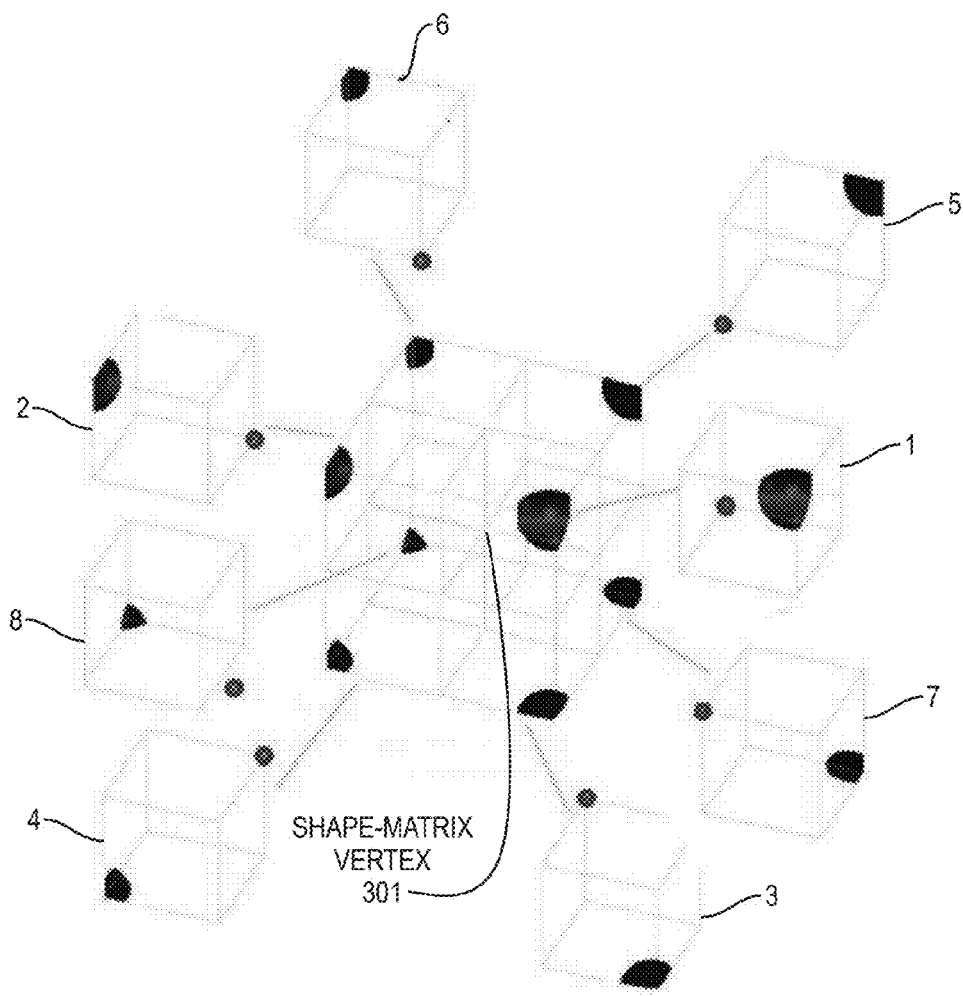

With the mother shape thus positioned, now imagine rotating each of the building blocks—with the corner shape therewithin fixed in place. The rotation is such that a different one of each building blocks' eight vertices is located at the shape-matrix vertex. The space defined by the eight interior corner spaces of the eight building blocks centered at the shape-matrix vertex is now empty. This can be seen in FIG. 3 wherein all of the building blocks have been rotated in an identical fashion so that each of the sphere corner shapes is now diagonally across from its original position. Again, rotation of the building blocks in an identical fashion is not required. Any rotation will do as long as the space defined by the eight interior corner spaces of the eight building blocks centered at the shape-matrix vertex 301 becomes empty.

Now imagine a second mother shape positioned as in the case of the sphere just discussed, i.e. positioned over the shape-matrix vertex and positioned such that a section of the mother shape falls in or near an interior corner space of a respective one of the eight building blocks. Repeat this for a total of eight times so that each of the eight building blocks will have a respective corner shape in or near each of its eight corner spaces. The manner of rotation of the building blocks to create a new empty space surrounding the shape-matrix vertex need not be the same for each of the building blocks as long as eight empty building block corner spaces are brought to the center of the shape-matrix grid with the shape-matrix vertex at its center. Thus, for example, various building blocks might be rotated in an x-axis sense, others in a y-axis sense and others in a z-axis sense.

As noted above, the center of the mother shape does not have to be coincident with the shape-matrix vertex. Indeed, some mother shapes, e.g., cones, do not necessarily have an interior point that is well-defined as being its "center." Moreover, the mother shape may have any desired orientation vis-à-vis the x-y-z-axes with which the building block edges are aligned.

Each mother shape may differ from each other mother shape in any one or more aspects, including the type of geometric shape, orientation vis-à-vis the shape-matrix as a whole (i.e. orientation vis-à-vis the x, y and z axes), position vis-à-vis the shape-matrix vertex and/or its orientation. Each mother shape may each have one or more respective surface "finish," such as a particular color, shading, cross-hatching or an apparent texture, such "finish" thus being imparted to the corner shapes derived from that mother shape.

Three-dimensional mother shapes I have used include: spheres, donuts/tori, cubes, cones, ovoids, tetrahedrons/pyramids and cylinders. However, any desired shape can be used as a mother shape. Of particular interest are shapes that are formally named in the science of geometry, such as square, triangle, circle when dealing with a two-dimensional shape matrix and such as sphere, torus, cube, cone, ovoid, tetrahedron and cylinder when dealing with a three-dimensional shape-matrix. Such shapes are familiar to humans and thus induce pleasing and/or satisfying feelings on the part of users when shape nuggets having such forms appear at the shape-matrix vertex during the process of manipulating the shape-matrix building blocks. Mother shapes can also be depictions of real-world objects.

A particular grid with a particular set of corner shapes fixed therein is what is referred to herein as a shape-matrix. Using a different grid and/or corner shapes that are at least in one way different from those of the first shape-matrix, results in a different shape-matrix. Each different combination of cube orientations of a particular shape-matrix is referred to herein as a conformation of that shape-matrix.

Figure 4:
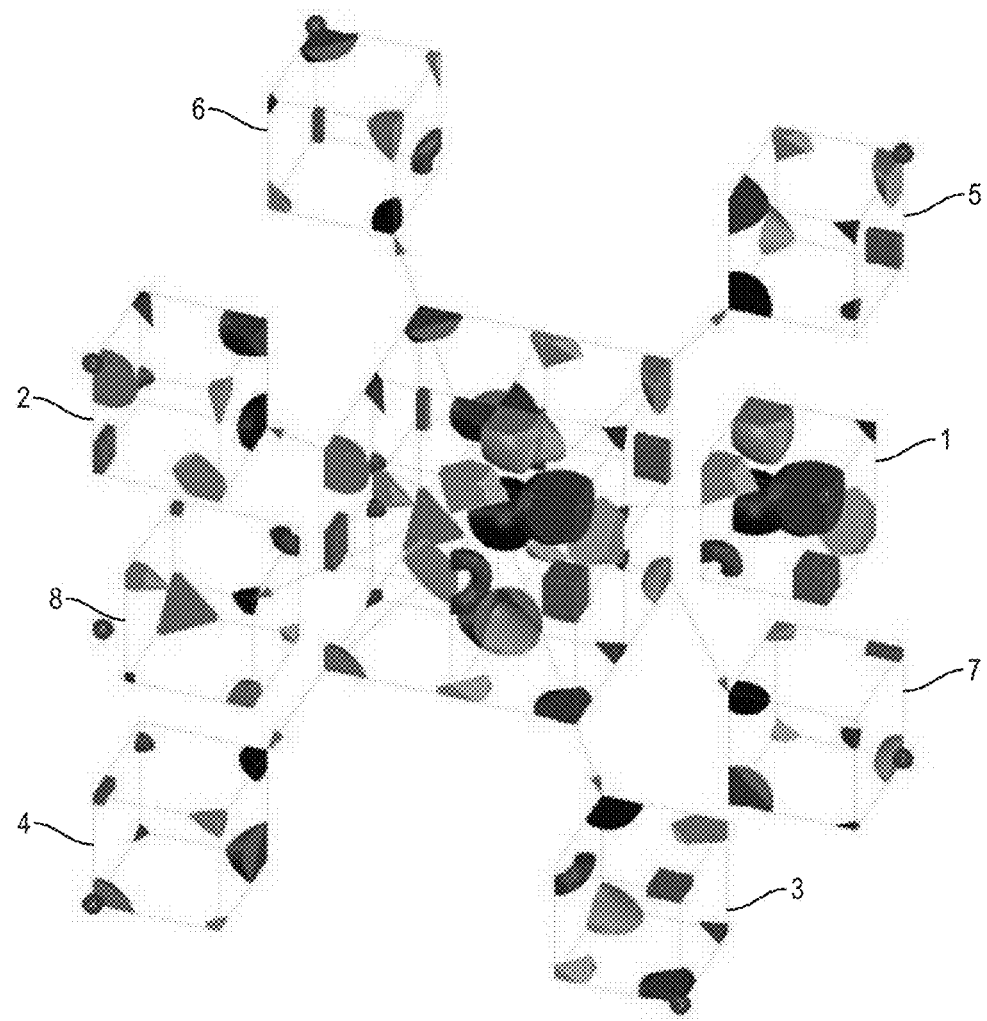

FIG. 4 shows a particular shape-matrix that includes the corner shapes shown in FIG. 2 and corner shapes for seven other mother shapes that can be thought of as having been positioned over the shape-matrix vertex. In this particular depiction, the cubes are in the same positions as in FIG. 2, so the sphere that we started with is in its original position over the shape-matrix vertex.

Figure 5:
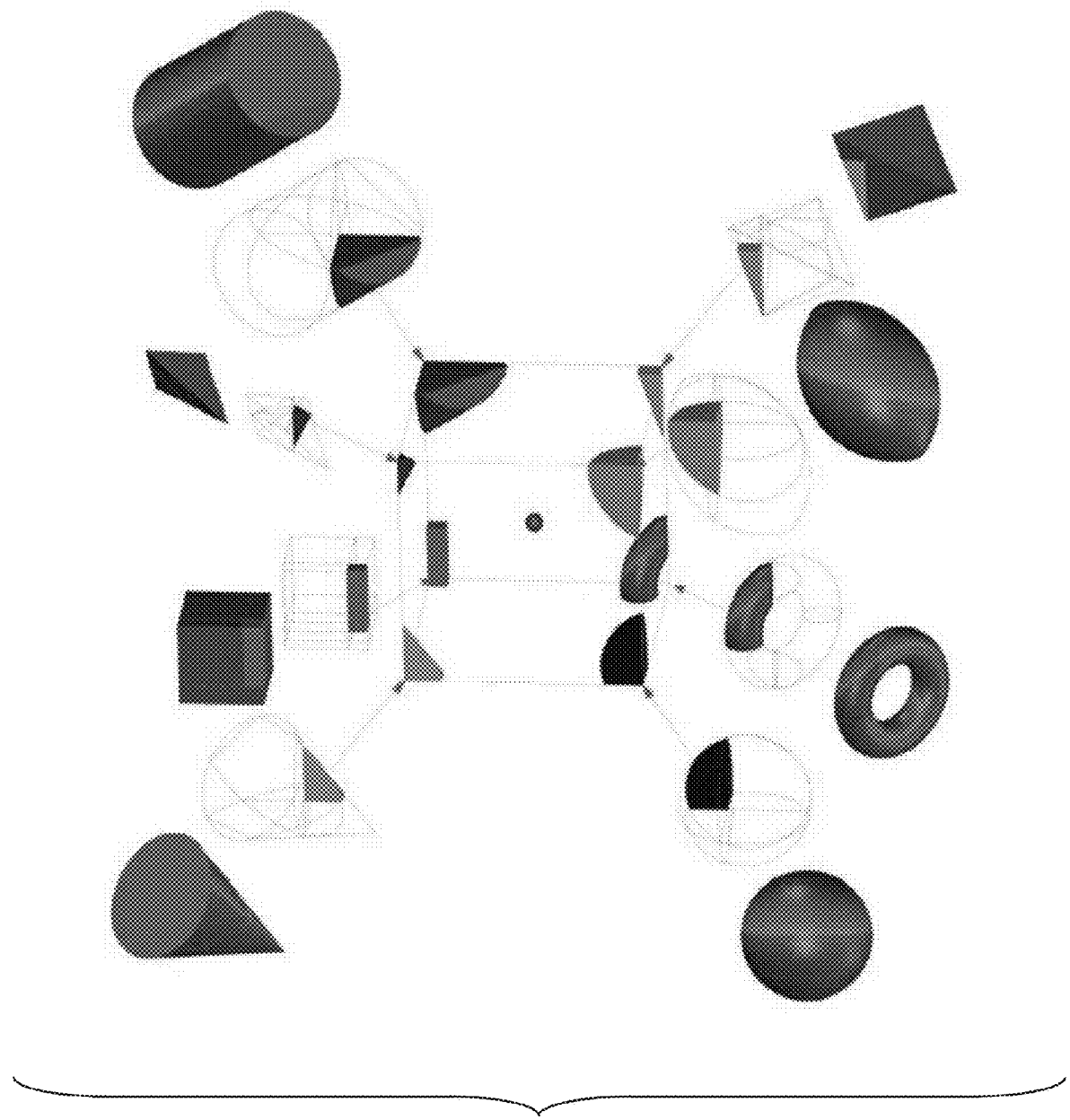

FIG. 5 shows how the corner shapes of cube 6, taken as exemplary, came to be. Eight different mother shapes were used. Reading counter-clockwise from the upper left, one can see that these were a cylinder, diamond/octahedron, cube, right circular cone, sphere, torus, ovoid and tetra. The various mother shapes have respective colors but only the corner shape that is within cube 6 is shown in the mother shape's color; the rest of the mother shape is shown black. Each mother shape is also shown in outline form with the corner shape shown in color. One can thus see how a corner shape of each of the mother shapes within cube 6 got formed. One can also see, looking back at FIG. 4, that all the corner shapes of a given mother shape have that mother shape's particular color. For example, all of the corner shapes of the first mother shape that we considered—the sphere depicted in FIG. 2—are black; all of the corner shapes of the torus mother shape are red; and so forth.

With each of the eight cubes now having one of eight corner shapes fixed in or near a respective one of that cube's eight interior corner spaces, imagine disassembling the shape-matrix into its eight constituent cubes and then reassembling the eight cubes again into a 2×2 matrix but where the locations and orientations of the cubes within the shape-matrix are chosen arbitrarily. Each different such reassembly of the cubes of a particular shape-matrix—which I refer to as a particular "conformation" of that particular shape-matrix—results in a different arrangement of eight corner shapes that are fixed within the cube interior corner spaces that surround the shape-matrix vertex. Each such arrangement of corner shapes is referred to as a shape nugget. Assuming that no two corner shapes are identical in all respects, a shape-matrix of the type shown in FIG. 4 gives rise to approximately 7.7 trillion different shape nuggets.

Figure 6:
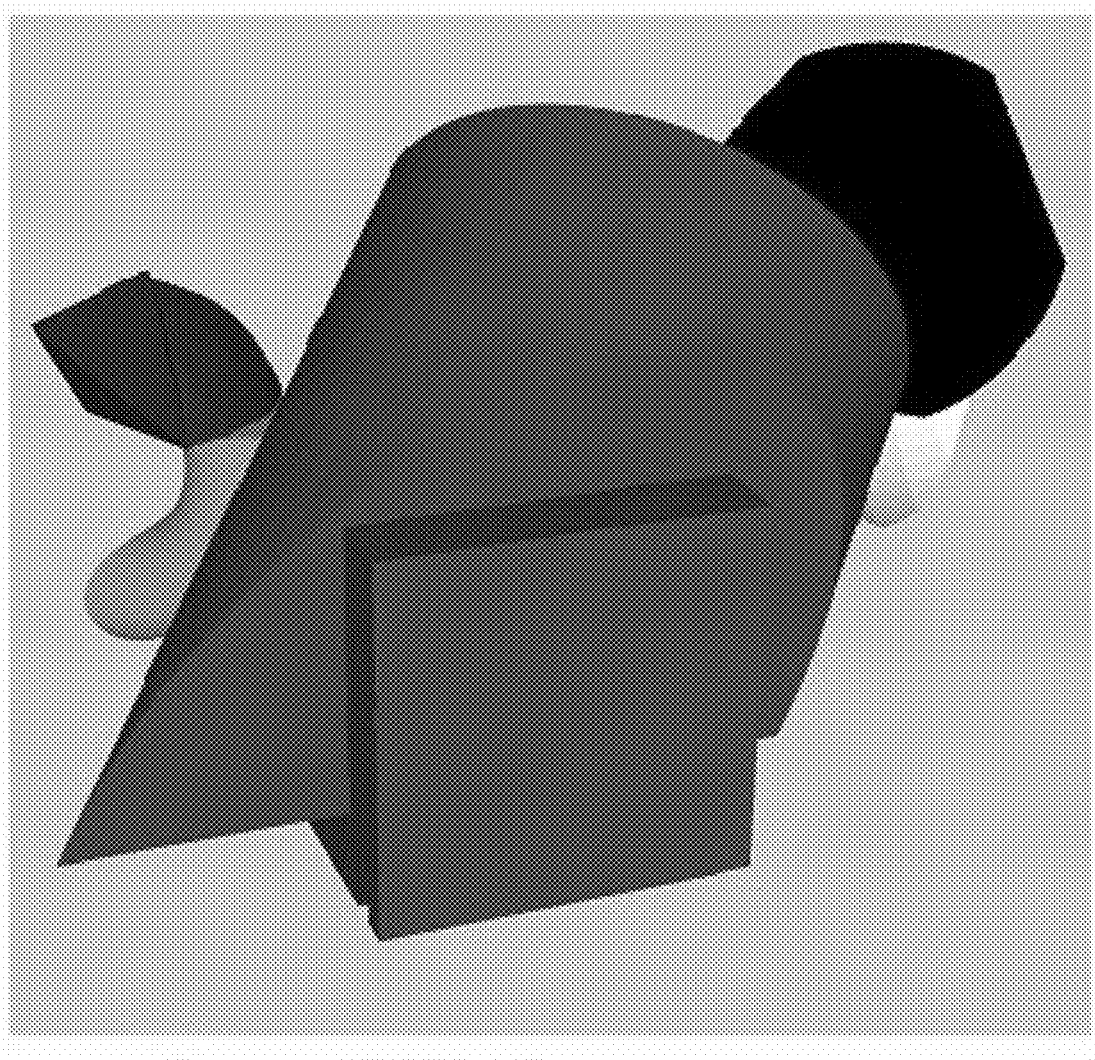
FIG. 6 is an illustrative shape nugget.

In FIG. 4, the shape nugget happens to be the sphere that we started with but, of course, of the very large number of possible different shape nuggets, only eight nuggets will be one of the mother shapes, assuming no two identical and identically-positioned mother shapes. In general, most shape nuggets will not be recognizable shapes but, rather, a seemingly fanciful random assemblage of corner shapes. FIG. 6 shows one such shape nugget created by a shape-matrix different from the one used in the example of FIGS. 1 through 5. Only 7 of the corner shapes are actually visible in FIG. 6. The eighth one is hidden behind the others in this particular view of the shape nugget.

The actual creation of a shape-matrix does not need to follow the exact protocol suggested above, i.e. the process in which mother shapes are successively positioned over the shape-matrix vertex and the cubes to provide an empty space for the next mother shape. Thus, for example, if the shape-matrix is created by software for ultimate presentation on paper or a computer display, the shape-matrix can be defined by the software in terms of data structures that define the contents of each of the cubes.

Alternatively, the shape-matrix might be created as a physical object using, perhaps wire-framed or plastic transparent cubes with the various corner shapes fixed therein. In such a case, the mother shapes may have been physically created, cut into their eight corner shapes, and then fixed into place within the various wire-frame or plastic cubes. Thus the above description—namely the protocol involving the placement of a mother shape at the center of the shape-matrix grid followed by a rotation of the cubes to create a new empty space around the shape-matrix vertex—should be understood as being simply a useful way to conceptualize how the various corner shapes get positioned at the various interior corners of the cubes.

Variations and Extensions of the Basic Shape-Matrix Construct

A shape-matrix may vary from, and/or be an extension of, the basic shape-matrix as described above.

For example, the shape-matrix may be made up of more than $2^N$ building blocks. Thus in the present example, the shape-matrix grid—and ultimately the resulting shape-matrix, might comprise more than the 8 "core" building blocks—i.e. the 8 constituent cubes whose corners are coincident with the shape-matrix vertex. The shape-matrix grid might comprise, for example, 27 cubes in a 3×3×3 arrangement. In such an embodiment, the notion of rotating cubes in order to bring new empty cube corner spaces to the shape-matrix vertex would be supplemented—again thinking of the shape-matrix being created by inserting mother shapes over the shape-matrix vertex and then moving the cubes—by moving cubes away from the shape-matrix vertex altogether. At the time that cubes of such a shape-matrix are brought together to create a shape nugget at the center of the shape-matrix, corner shapes at or near the interior corners of only eight cubes will form the shape nugget. The other (27-8=) 19 cubes' corner shapes would not contribute to that particular shape nugget. Rather they would contribute to other shape nuggets created when a corner of one or more of those other cubes was brought to the center of the shape-matrix grid so as to be coincident with the shape-matrix vertex.

As another variation, one or more mother shapes might be positioned and/or might be inherently configured such that, the mother shape falls into less than all eight of the cubes.

Figure 7:
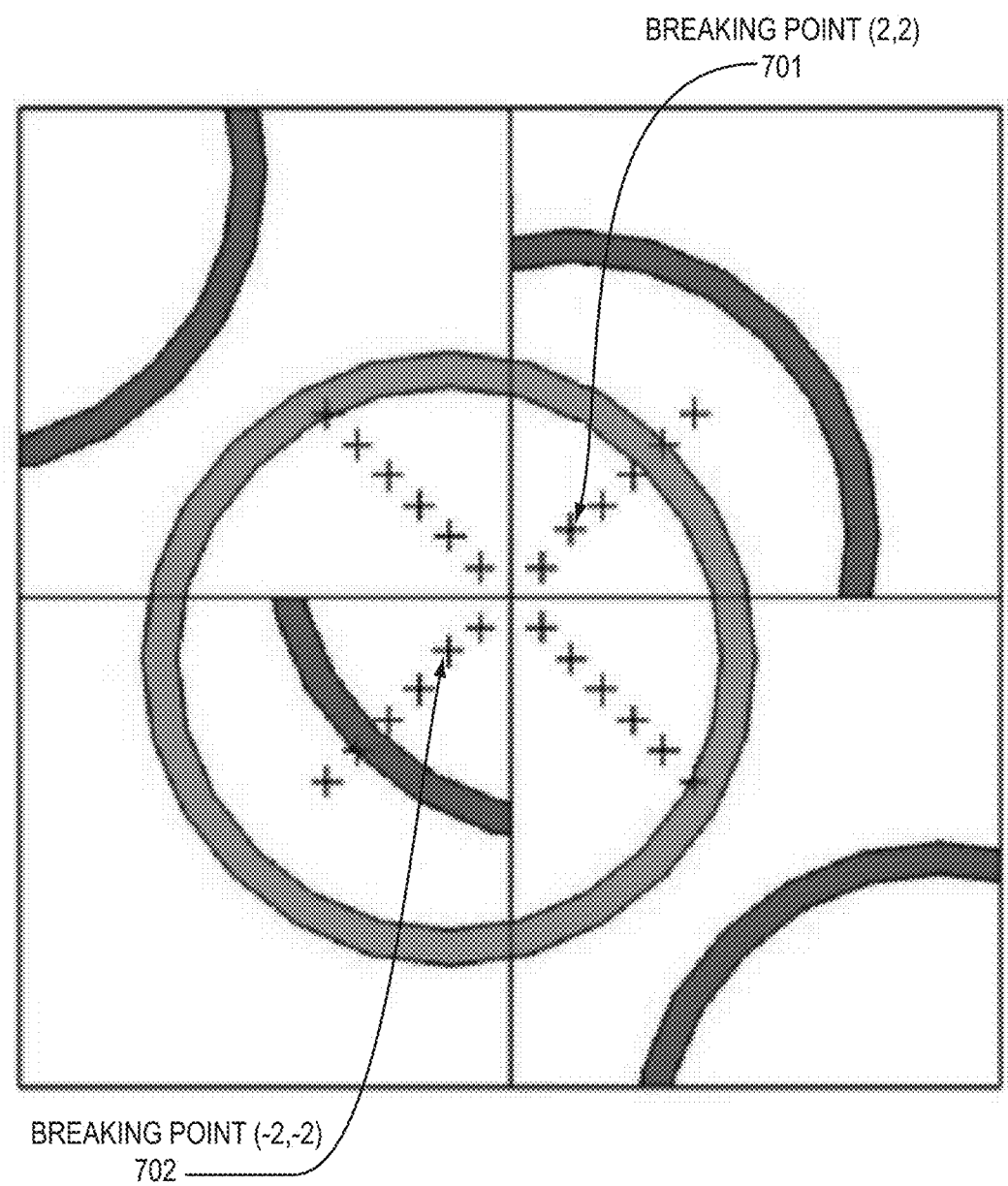
FIG. 7 illustrates aspects of two-dimensional shape-matrices.

The shape-matrix might be two-dimensional rather than three-dimensional wherein—in the case of a rectilinear co-ordinate system—the shape-matrix grid could be made up of squares, and wherein there would be as many as four mother shapes that would be two-dimensional rather than three-dimensional. FIG. 7 shows such a two-dimensional shape-matrix where there are actually two mother shapes—a green ring and a red ring. FIG. 7 could alternatively be understood as a two-dimensional shape-matrix that is in the process of being constructed, wherein the green ring has just been positioned over the shape-matrix vertex so that the next step would be the rotation of the shape-matrix squares to new orientations in order to prepare for the insertion of a third mother shape.

FIG. 7 provides an opportunity to illustrate another aspect of shape-matrix construction that is applicable not only to two-dimensional shape-matrices but to three-dimensional shape-matrices as well. That aspect is the fact that very small changes in location of a mother shape vis-a-vis the shape-matrix vertex will not be perceivable by the human visual system. Thus shape nuggets of two shape-matrices that differ only in terms of mother shape placement will be perceived as being different only if the locations of the mother shape centers in the different shape-matrices are sufficiently different from one another. This can be taken into account when one is deciding on a position for a mother shape if one is wanting to generate shape-matrices and/or shape nuggets that are perceivably different from one another.

I have explored this phenomenon in the context of positioning the centers of two-dimensional mother shapes along the diagonals of the shape-matrix squares. I refer to a set of locations along those diagonals—shown as x's in FIG. 7,—wherein the differences in the resulting corner shapes and/or shape nuggets can be perceived as being a set of "break points" or "breaking points." FIG. 7 shows, among other things, breaking points 701, 702.

And as yet another variation, the shape-matrix might be based not on a rectilinear co-ordinate system as would be the case for a cube-based shape-matrix grid, but, perhaps, a cylindrical or spherical co-ordinate system wherein the various components of the shape-matrix grid would be something other than cubes or other rectilinear building blocks. In the remainder of this document, we will for convenience continue to assume that the shape-matrix grid is based on cubes and a rectilinear co-ordinate system, but it should be understood that many, if not all, of the various aspects and uses of the shape-matrix described herein might also be applied in a non-rectilinear co-ordinate system.

Shape-Matrix Geometric Instruments

In one sense one might think to regard the shape-matrix as just a mathematical construct or abstraction. However, both physical and computer-generated implementations of the shape matrix and/or its components have real-world implementations. Each such implementation is referred to herein as a shape-matrix geometric instrument, so as to distinguish it from the shape-matrix construct per se.

A shape-matrix geometric instrument can be implemented in either two dimensions or three dimensions.

For example, a two-dimensional implementation of a two-dimensional shape-matrix geometric instrument may comprise a set of physical tiles each having corner shapes depicted thereon. An example is seen in FIG. 7. A user rotating and/or rearranging the tiles is able to create various different two-dimensional shape nuggets at the shape-matrix vertex.

Figure 8:
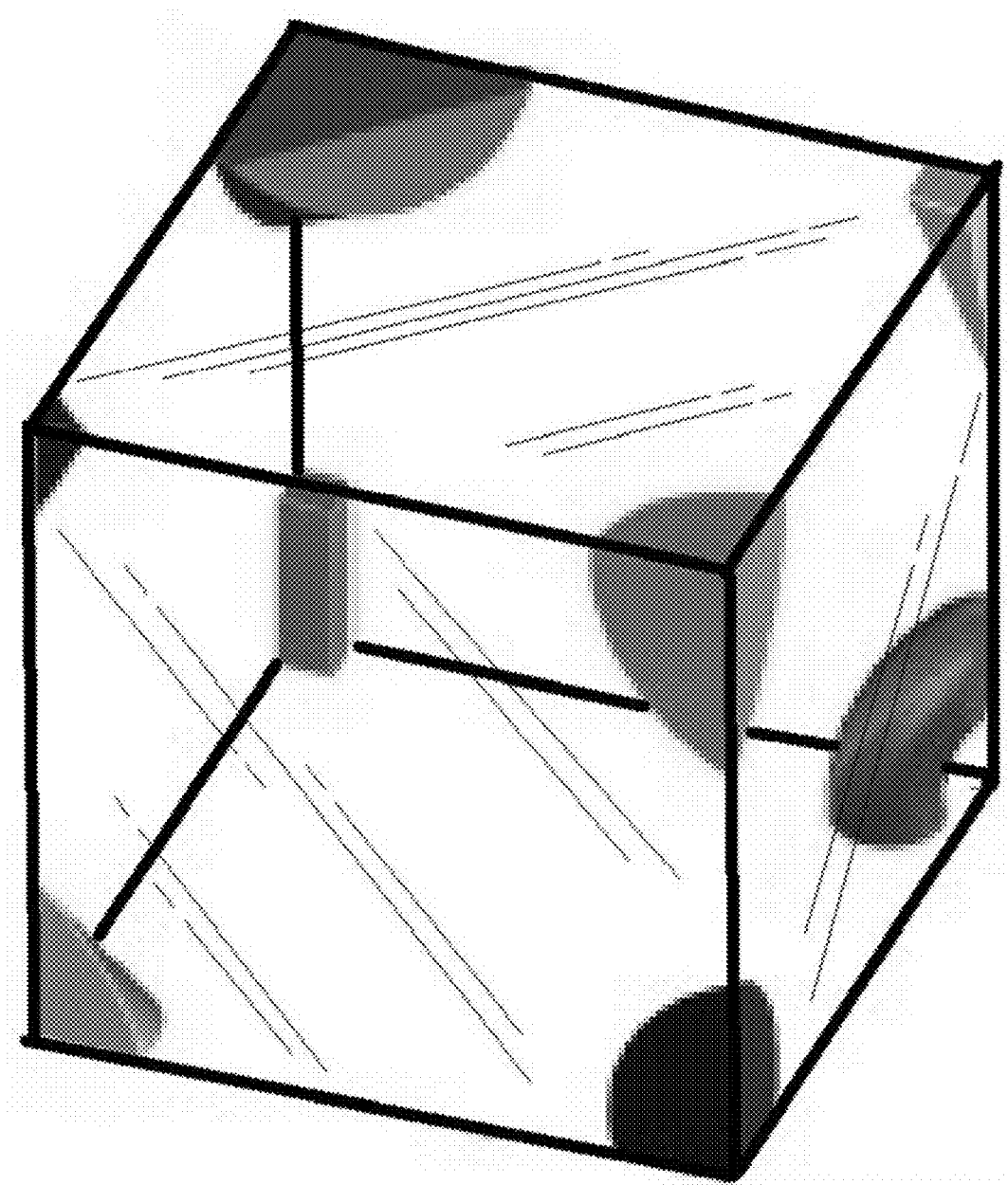

A three-dimensional implementation of a three-dimensional shape-matrix geometric instrument may comprise, for example, a set of physical three-dimensional blocks, such as cubes, corresponding to the constituent polytopes of the three-dimensional shape-matrix. The blocks are configured such that their interiors can be seen with the naked eye so that each shape nugget can be seen with the naked eye. Such an implementation might be, for example, a set of blocks formed from transparent plastic or other material with the various corner shapes embedded therein. FIG. 8 depicts one such block based on cube 6 of the shape-matrix shown in FIG. 4, that cube also being shown in FIG. 5. A user rotating and/or rearranging the blocks is able to create various different three-dimensional shape nuggets at the shape-matrix vertex.

Figure 9:
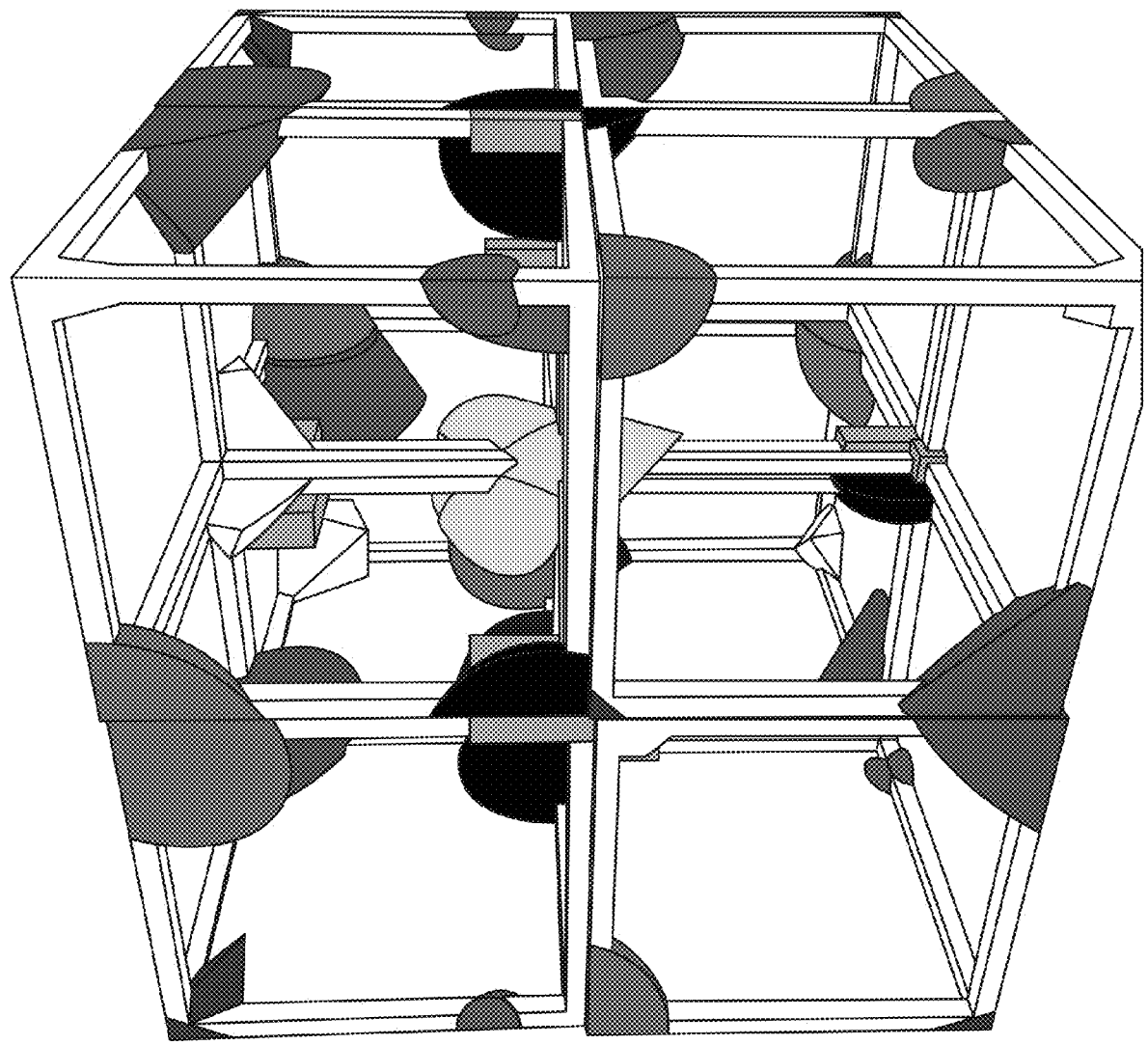
FIGS. 9-13 shows various views of three-dimensional shape-matrix geometric instrument comprising eight cubes wherein each block is an open framework of joined edges.
Figure 10:
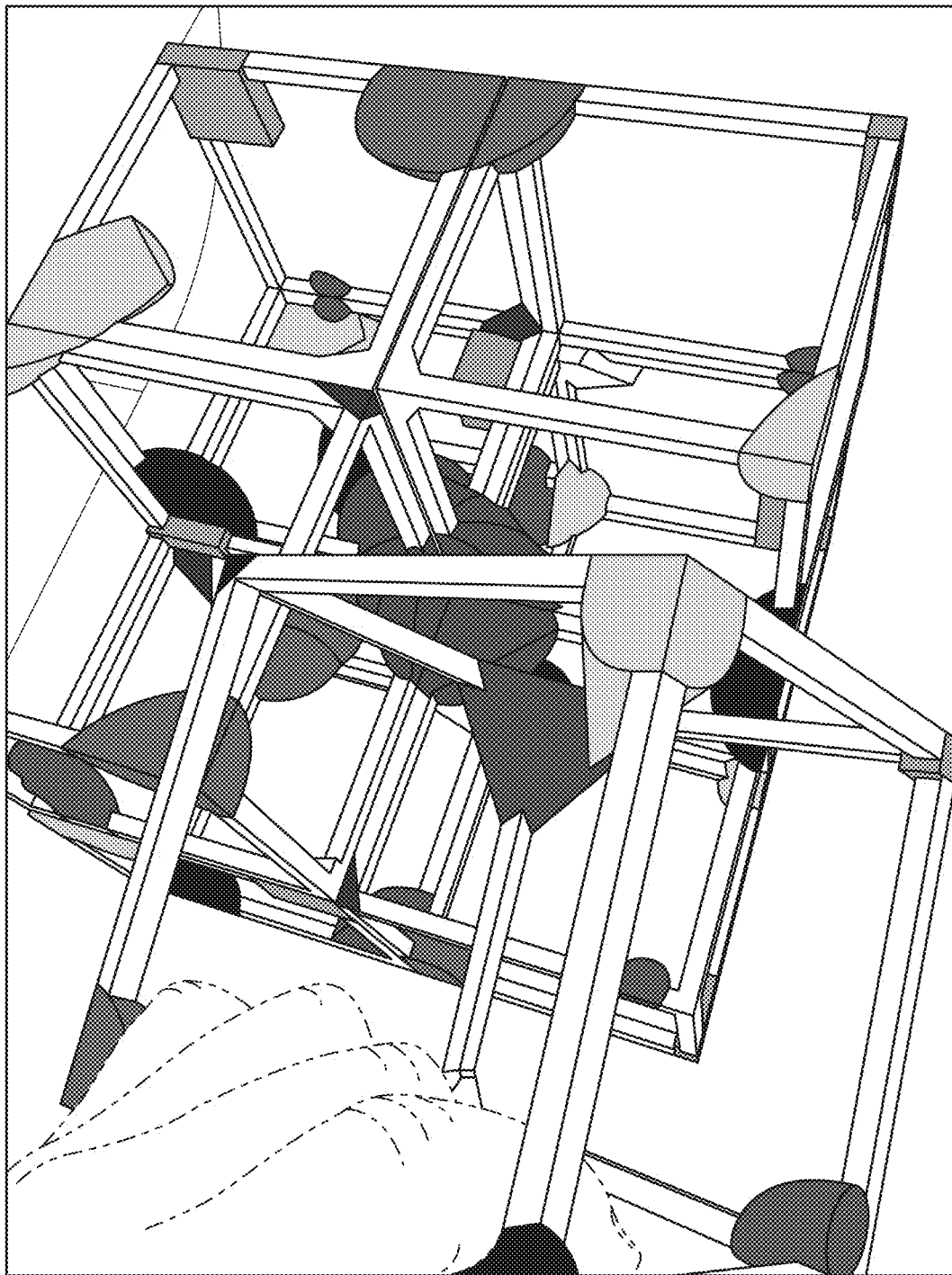
Figure 11:
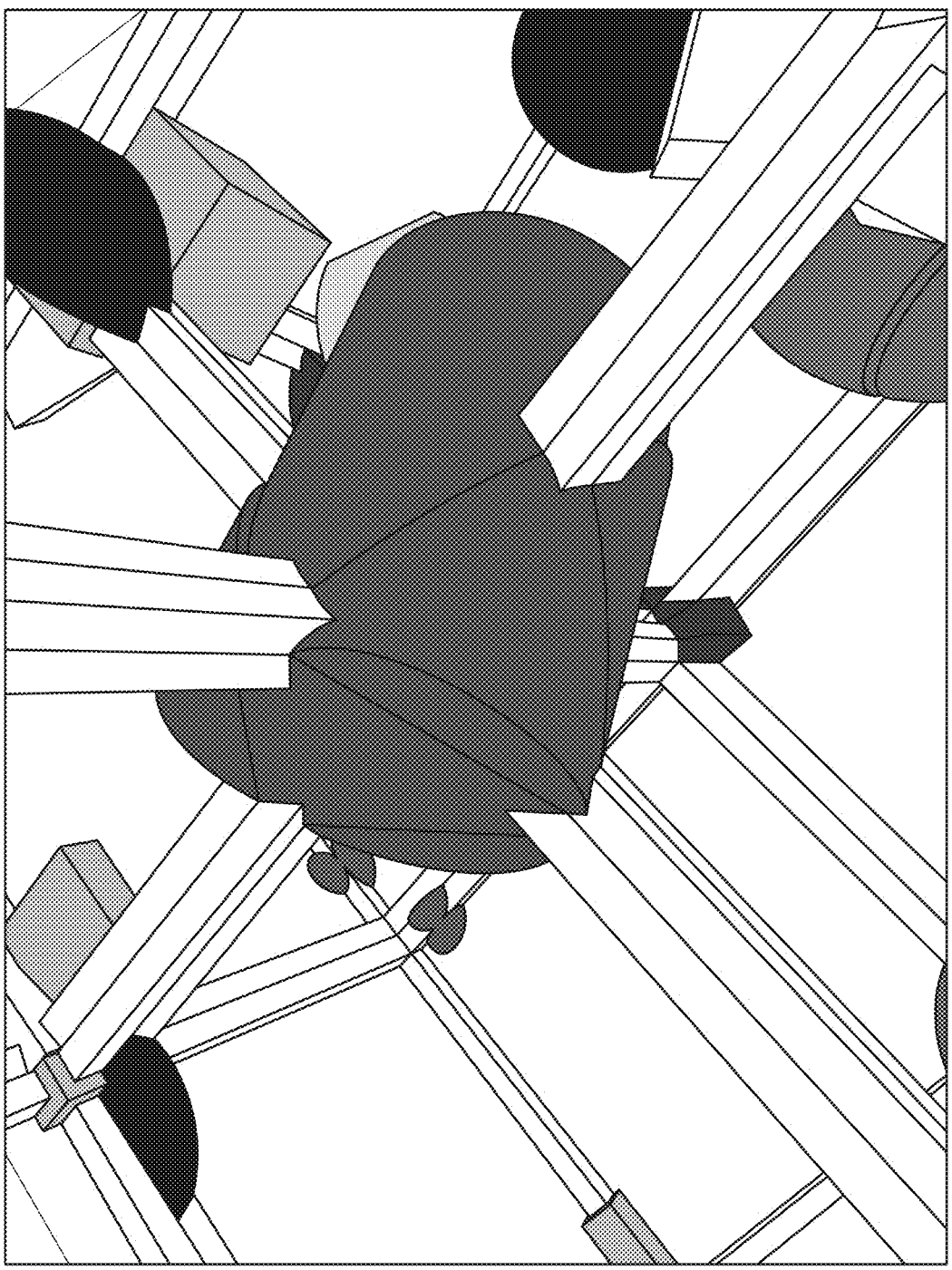
Figure 12:
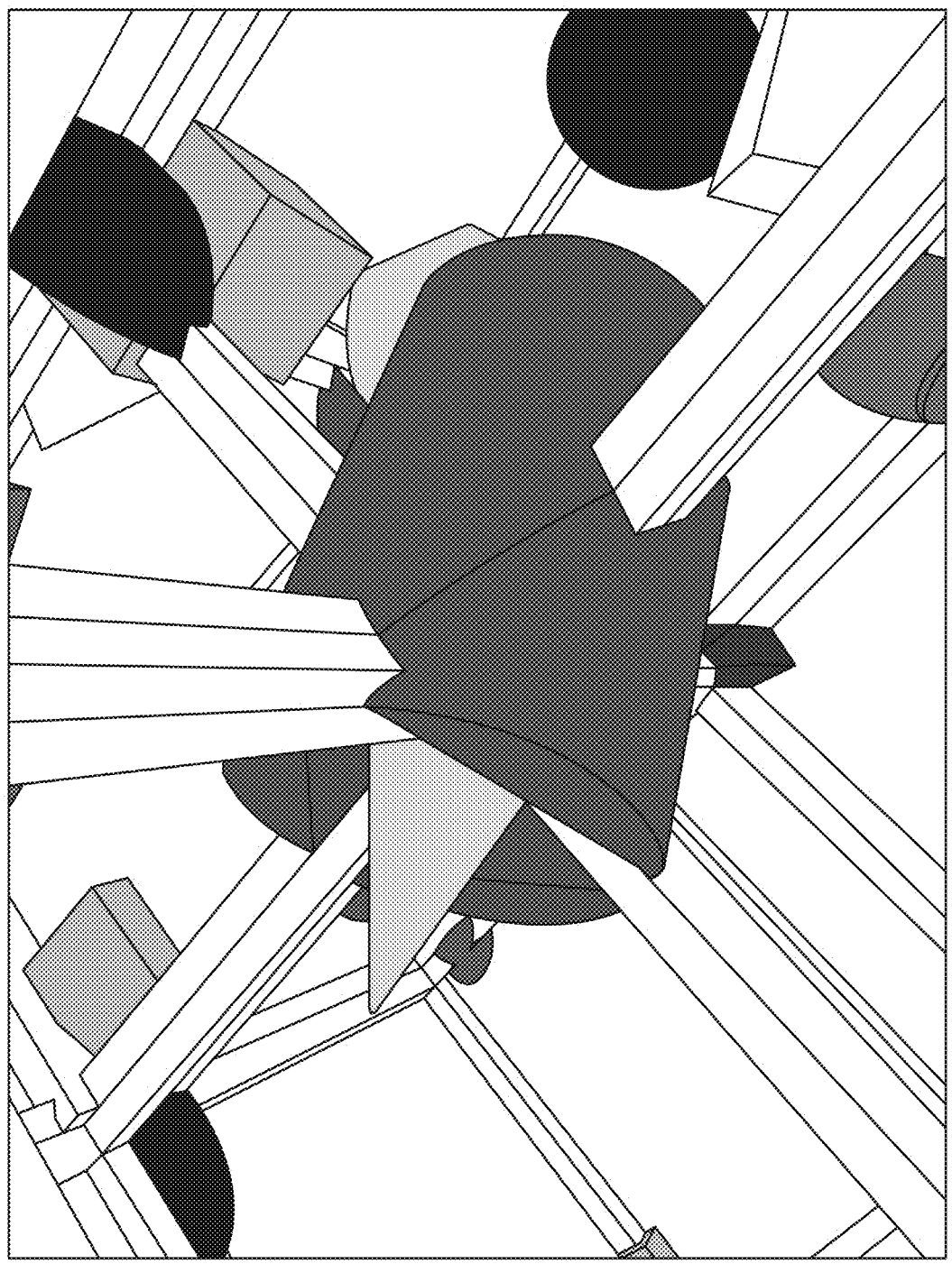
Figure 13:
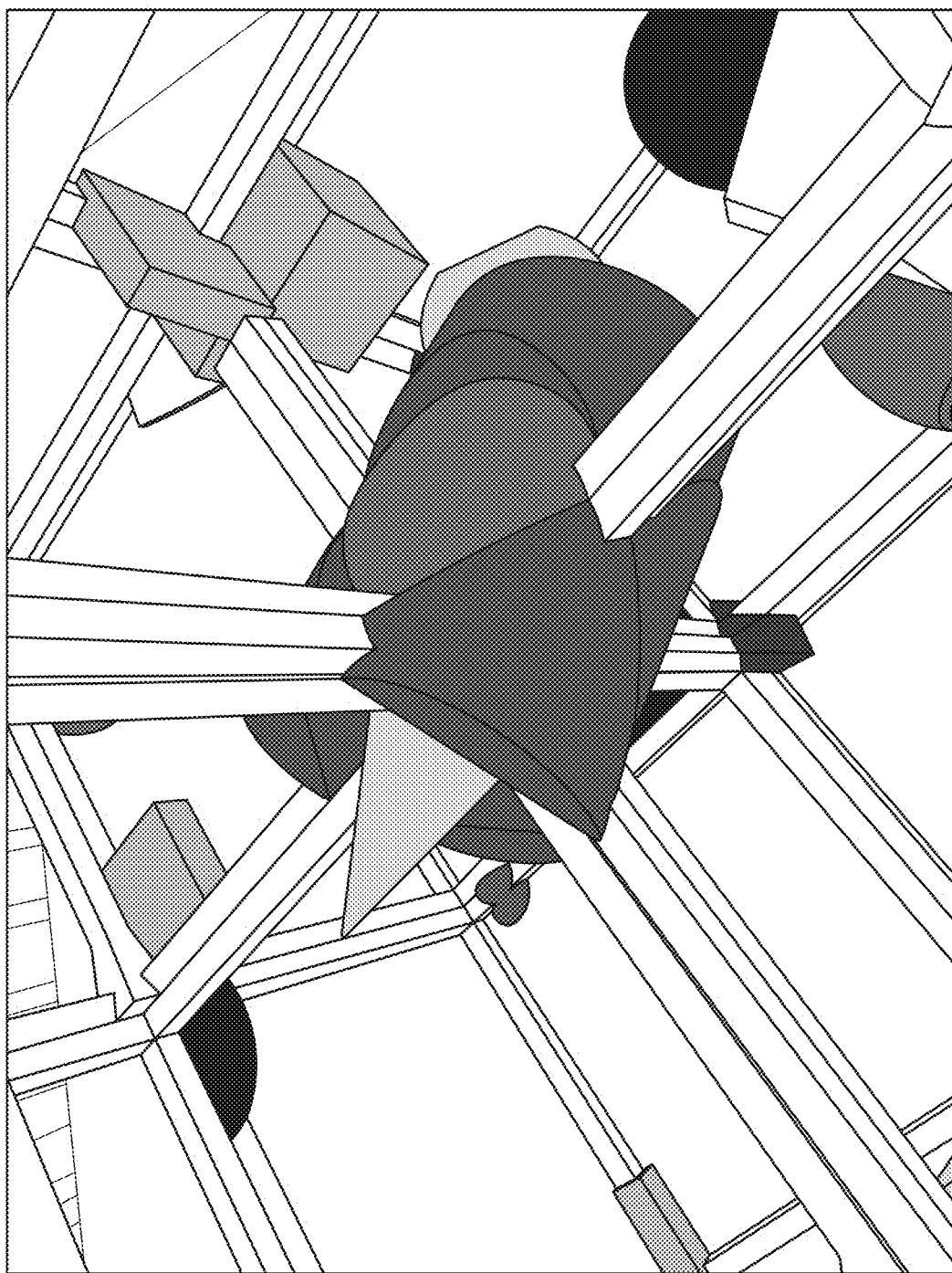

In another implementation, each block might be an open framework of joined edges, with the block's corner shapes each being attached to one or more of that block's edges. FIGS. 9-13 show such an implementation of a shape-matrix geometric instrument of FIG. 9 comprising eight cubes. In particular, FIG. 9 shows the shape-matrix geometric instrument as a whole. FIG. 10 shows a portion of the shape-matrix geometric wherein the hand of a user is shown in the process of rotating one of the cubes to a new position. And FIGS. 11-13 show a portion—namely the central portion including the shape nugget—of the three-dimensional shape-matrix geometric instrument of FIG. 9 in various ones of the shape-matrix geometric instrument's conformations resulting from user rotation of various ones of the cubes.

Yet other implementations may just comprise for example, a set of corner shapes formed from mother shapes in the manner described above. A set of such "shape beads" could be magnetized or otherwise configured so as to allow users to make all of the possible shape nuggets. The shape beads might also be provided with through-holes, allowing them to be threaded on a cord, string or the like for, for example, storage. The holes would be placed in the corner shapes in such a way as to not pass through any of the corner planes of corner shapes, thereby allowing the various shape nuggets to be formed unhindered by the string or cord.

A two-dimensional implementation of either a two-dimensional or a three-dimensional shape-matrix geometric instrument may comprise, for example, a two-dimensional graphic medium, such as paper or a computer screen or other display device, on which the shape-matrix or at least ones of its components (e.g., a shape nugget) are depicted. When the shape-matrix is three-dimensional, such implementations will typically use perspective, shading and so forth to depict the three-dimensionality. Examples are seen in FIG. 4 (entire shape matrix) and FIG. 6 (just a shape nugget).

When the shape-matrix geometric instrument presents the shape-matrix or its components on a computer screen or other display device, as suggested above, the shape-matrix geometric instrument may include a non-transitory computer readable medium on which are stored program instructions which, when executed by one or more processors, display on a display device a perspective view of at least a portion of a shape-matrix, and manipulate the perspective view in response to user inputs, thereby allowing for user interaction with the displayed shape-matrix. Such interaction might include the ability of a user to manipulate the user's orientation or "point of view" vis-à-vis the shape-matrix and/or its components, as well as to manipulate individual components, such as individual building blocks of a shape-matrix in to order to create different shape nuggets. Various such implementations may not show the cube edges but, rather, just the various corner shapes albeit each still being fixed at or near a corner of an inviolate cubic space. A user might also, for example, be provided with the ability to create shape matrices using any described corner shapes, including corner shapes formed from mother shapes, as well as to manipulate user-created and/or pre-created shape-matrices and/or their components on the screen and/or to vary the various corner shape and/or mother shape properties mentioned above including shape, orientation and finishes.

As alluded to at various points in the description hereinabove, some implementations may involve presentation of an entire shape-matrix, with the cube edges and all corner shapes being shown. Others may involve presentation of only the corner shapes. Other applications may involve presenting only some of the corner shapes, such as those constituting a particular shape nugget, as depicted in FIG. 6.

The program code implementing embodiments could either be in the form of a stand-alone program or in the form of a program with an interface that allowed the integration of the invention into other software applications, e.g., when the invention is used in password applications as described herein. For example, a graphical user interface could be built that would allow users to manipulate, create and store shape nuggets on their mobile devices that can be shared across devices.

To the extent that a computer screen is used as the presentation medium, a shape-matrix and/or its components may be shown "in motion" using computer-based graphics. That is, one can show the various shape-matrix cubes rotating and/or moving translationally across the screen over time, either as part of a shape-matrix-creation process or a shape-matrix-manipulation process. The latter might consist of one-at-a-time rotation and/or translation of cubes within the shape-matrix with the result of a viewer being able to see the shape nugget "morph" or evolve over time as successive ones its constituent corner shapes get replaced by other corner shapes.

The apparent position of the viewer vis-à-vis the shape-matrix and/or stand-alone shape nugget can also be changed over time, allowing the viewer to see the shape-matrix and/or the shape nugget from any desired angle "above," "below," or from the "side" of the shape-matrix. Such apparent motion on the screen could be preprogrammed so as to present the viewer with a kind of pre-defined animated "movie." Or the viewer might be provided with the ability to manipulate the displayed image via a joystick, keyboard, mouse or other interface device in such a way as to be able to, for example, a) rotate or otherwise move the shape-matrix cubes and thereby create shape nuggets of the viewer's choosing and/or b) change the apparent viewing angle. Indeed, the programming might provide the user with the ability to "freeze" a shape-matrix in one of its conformations and then the user can manipulate the "frozen" displayed image to examine the shape-matrix from some desired angle, or perspective. In some embodiments variables such as speed rotation and position can made adjustable so that the cubes (or other building blocks) move and/or re-orient at different rates and in different directions. The result can be a perpetually evolving recombination of the corner shapes and/or the shape nuggets.

Figure 14:
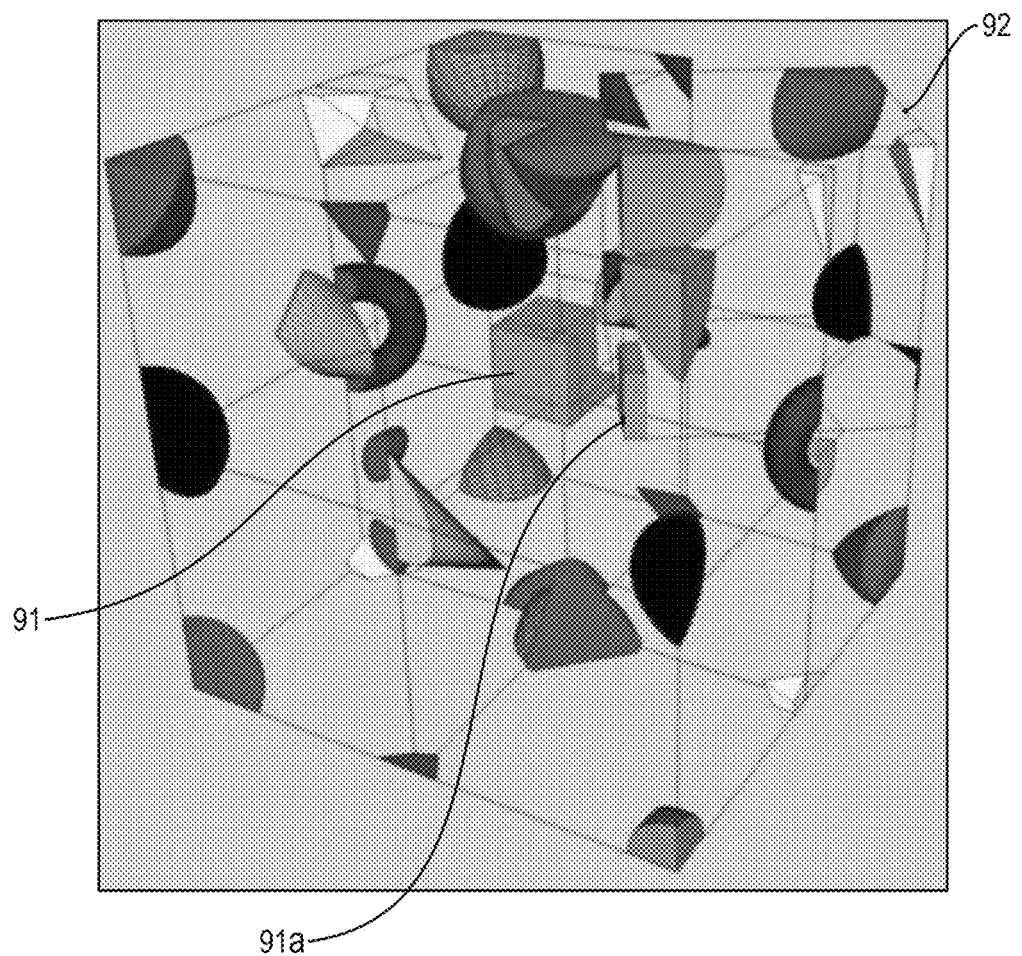
FIGS. 14 and 18 illustrate aspects of a computer-implemented shape-matrix geometric instrument.
Figure 15:
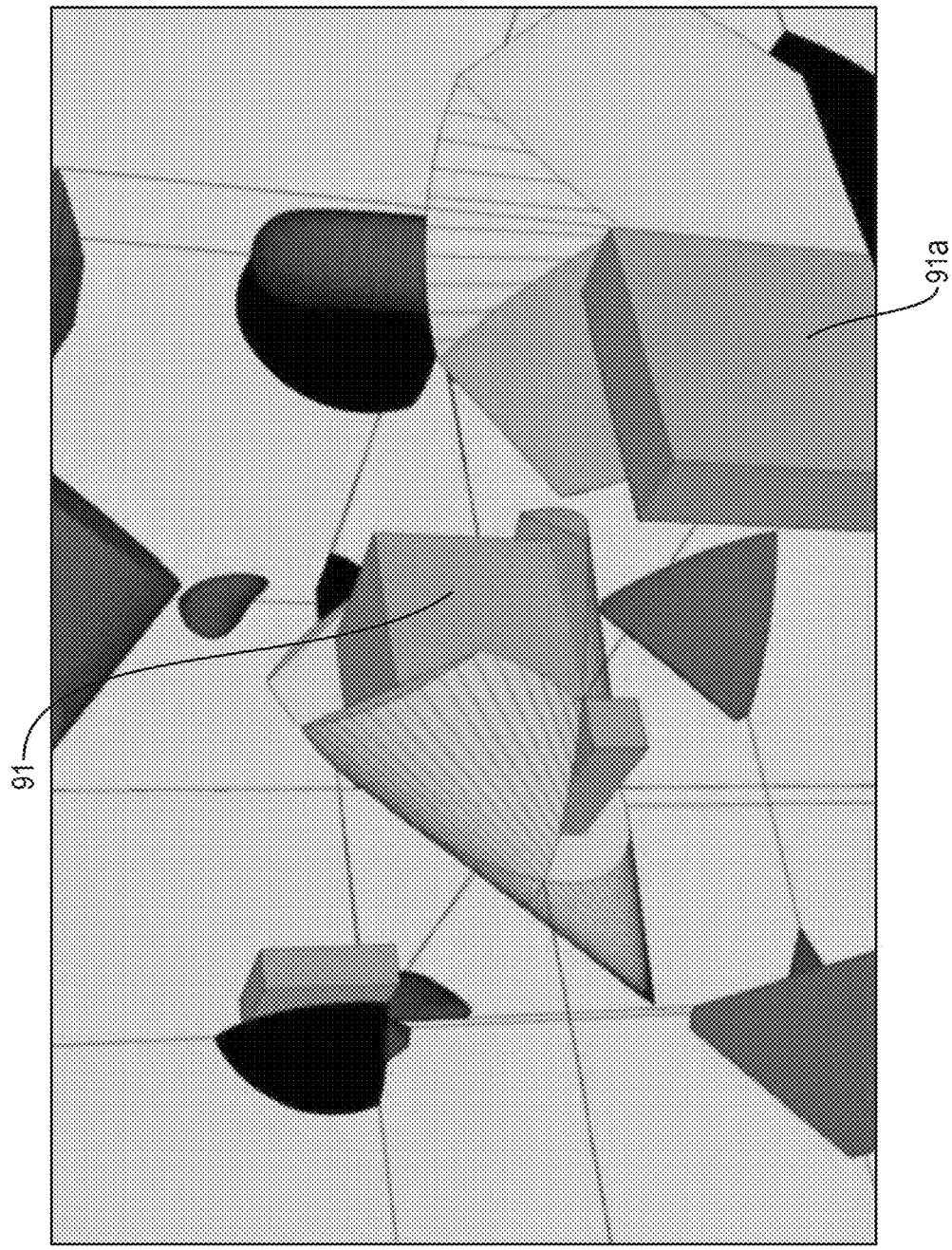
FIG. 15 shows a morphing process and also illustrates the capability of a program that generated animation to present the animated shape-matrix from varying points of view and at varying levels of zoom.

A simple example of the foregoing is shown in FIGS. 14 and 15, which are screen shots of an animation wherein the shape nugget happens to be a complete orange mother shape 91. As seen in FIG. 14, that shape nugget is in the process of being morphed into a different shape nugget. Specifically, shape-matrix cube 92—one of whose corner shapes is corner shape 91*a* making up the shape nugget 91—is in the process of rotating, illustratively, counterclockwise, thereby removing corner shape 91*a* from the shape nugget. FIG. 15 shows the morphing process at a subsequent point in time and also illustrates the capability of the program that generated the animation to present the animated shape-matrix from varying points of view and at varying levels of zoom. In FIG. 15, corner 91*a* and two other corner shapes of the shape nugget have now been totally rotated away from it and three other corner shapes have been rotated into place. In this example, the rotation of various shape-matrix cubes has been such as to add to the shape nugget corner shapes from a particular one other mother shape—a yellow cone. Of course, in general, the shape-matrix cubes can be rotated in such a way as to create shape nuggets from as many as (in this embodiment) 8 different mother shapes, such as is depicted in FIG. 6.

Applications and Uses of Shape-Matrix Geometric Instruments

Shape Strips

One can program a computer to randomly "roll" electronically way the cubes of an N-cube shape matrix—where N is a number such as 512—so that each cube has a randomly selected orientation. The computer can thereupon assemble the cubes thus oriented into an 8×8×8-cube "supercube", create respective images of each of the six sides of the supercube, and assemble the six images side-by-side to form what I refer to as a "shape strip." Such shape strips could be used to detect/prevent currency counterfeiting. The number of different shape strips achieved by this process would be sufficiently large as to allowing each printed currency bill to be micro-printed with a unique shape strip. Thus each bill could be tracked back through a main system for its authenticity and thus identifying counterfeits.

Information like this can also be used in magnetic strips and for computer passwords and can protect multiple types of information in multiple formats.

As an alternative imaging modality to printing a shape strip, a virtual shape strip might be created by projecting light through a tube containing shape-matrix components and the resulting projected image could then be used as a passcode, for example.

Data Transmission

Data transmission is currently based on alphanumerics. Each character has a limited pool of alphanumeric possibilities that it can be translated into. The more characters and bits, the more computing power is needed. Instead each alphanumeric character can be translated into a shape nugget. An illustrative four-step process for doing this is as follows:

Step 1: A corner shape is assigned to a corner of a cube.
Step 2: A color is assigned to each corner shape.
Step 3: Depending on the number of cubes making up the shape-matrix (8, 16, 64, 512, etc.), a computer randomizes the position of each cube in the shape-matrix by assigning a number to each cube and randomizing that number. This creates a sequence of number combinations.
Step 4: Each individual cube can then be rotated into any of 24 different orientations and positioned accordingly using a variable and further strengthening the number sequence.

A variation on the above is to have Steps 1 and Steps 2 predetermined at the point of transmission and the point of receipt, so that the only information that is required to be transmitted is the sequence making up Steps 3 and 4.

Signaling

A shape-matrix can be configured to be a variable resistor. For example, in the embodiment of FIGS. 9-13, one might provide an electrical lead extending along each edge of each block and terminating at one end on a respective corner shape. The corner shapes themselves would have differing resistances, with the result that the resistance of the shape nugget as a whole will vary depending on which corner shapes the shape nugget it is made up of at a given time and how those corner shapes are oriented. One can, for example, apply a voltage across the shape-matrix by applying that voltage to two of the leads. The level of the resulting current will depend on the resistance of the then-extant shape nugget. One can thus envision an information-transfer application in which different signals (e.g., currents) are communicated based on the present conformation of the shape-matrix.

Personal Identification/Authentication

Figure 16:
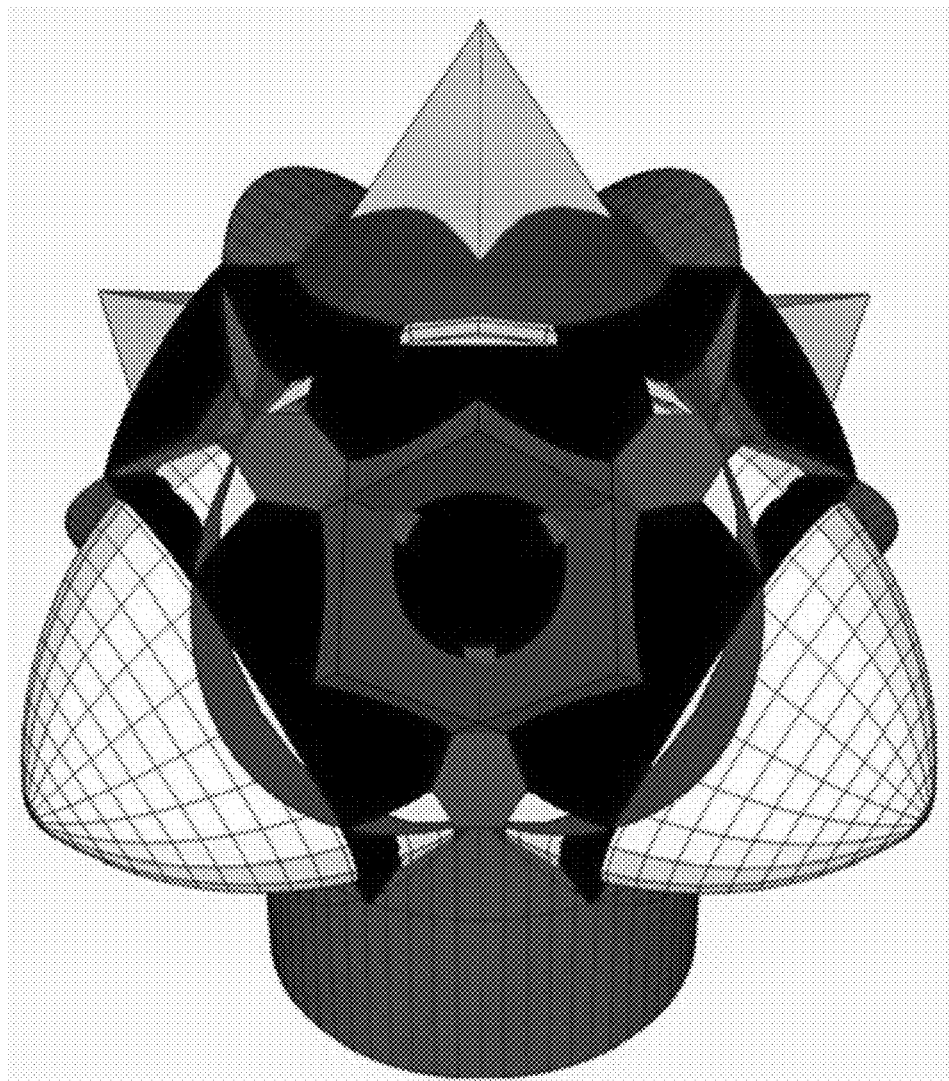
FIGS. 16 and 17 show examples of sub shapes and shape nuggets three-dimensionalized for human visual and touch use as well as computer touch.
Figure 17:
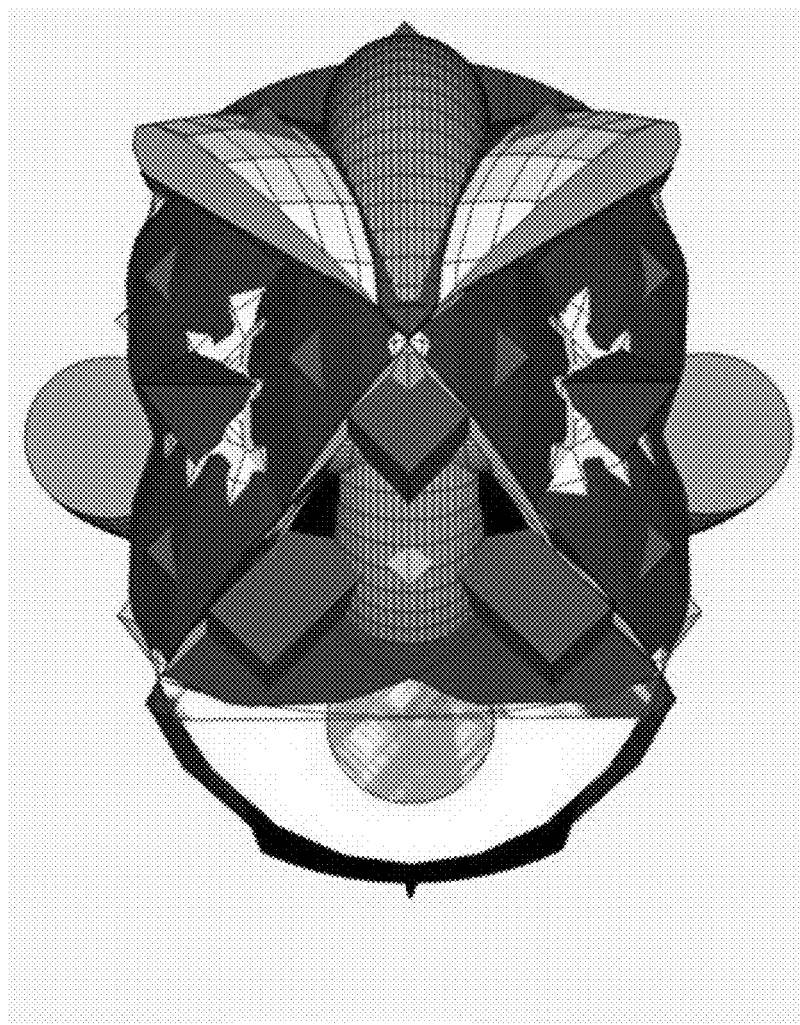
Figure 18:
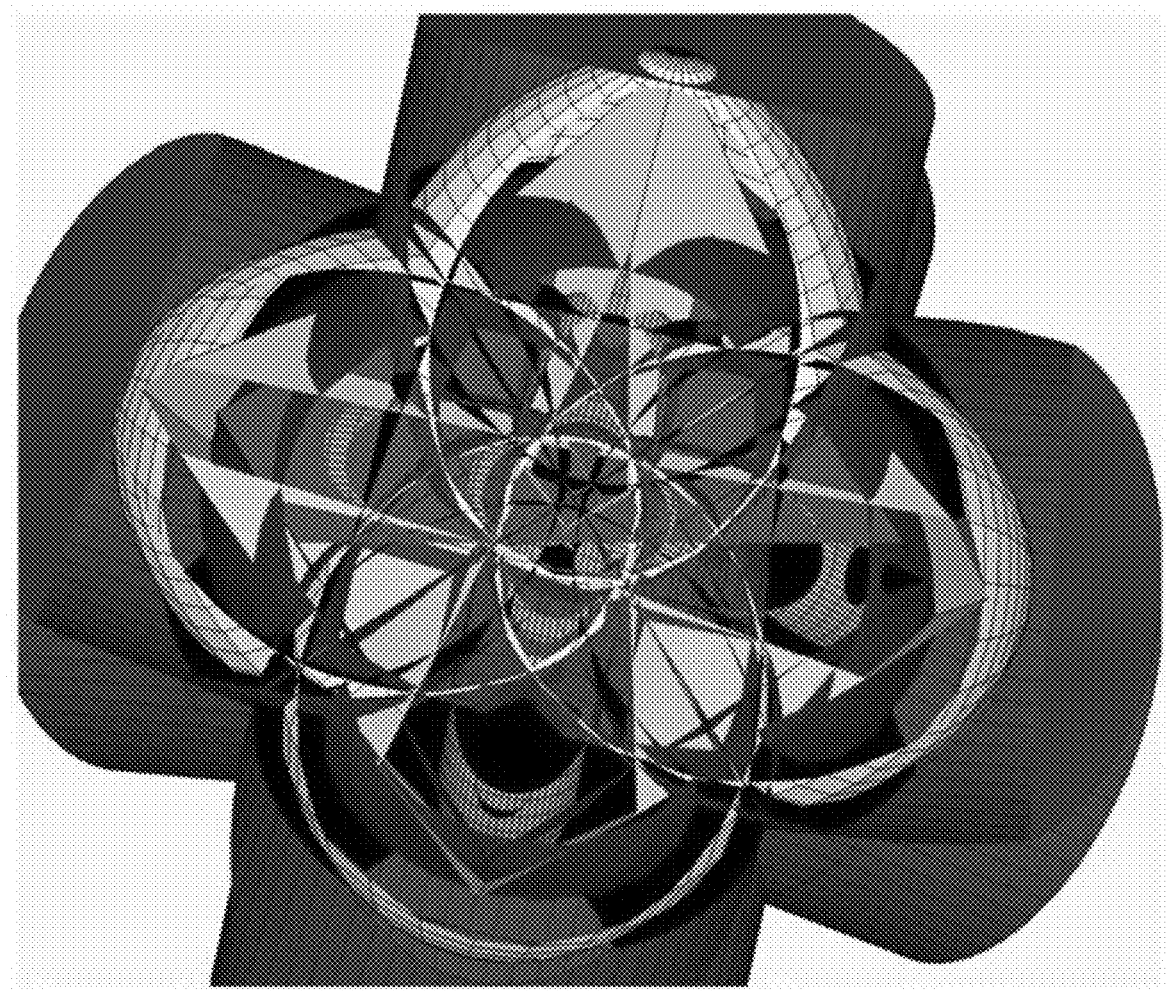

People can sign up for a specific personal manipulative shape of their choosing by way of a computer program that would allow a user to select a shape and color combination—much like buying a ".com" entity—in order to generate a three-dimensional avatar identity. Since it is three-dimensional, it can be manipulated on a screen so as to be able to be viewed from different angles or points of view and used as a point of origin that can be used in one or more simultaneous formats. That is to say, the shape nugget would be used as a core identity, or three-dimensional password or passshape. Once an identity or shape nugget is chosen, one may choose to embed that identity in other three-dimensional avatars allowing control of a cloaking mechanism and control mechanisms. This cloaking function would allow one's passshape to be indentified or not in a virtual environment such as a video game with multiple characters. In other words one could pick a shape nugget and much like Russian matryoshka (nesting) dolls, the passshape could control a set of appearances and exist as a key in order to control their actions and movement as in action figures in a video game such as a dragon, mouse, man, car, space ship or other shape nugget, thereby giving people access to certain layers of function based on an interaction with that three-dimensional layer or shell or successive outer shapes like layers out from a core. Each layer as seen in cross section may intersect with successive layers or three-dimensional shape intersections to create a whole other order of controlled complexity where noticeable shapes occur intersecting each other. And these may be used to create a deeper complexity within a shape identity. Instead of a flat alphanumeric user name, one's three-dimensional passshape or shape nugget would hold more information, giving the owner of that passshape or shape nugget different levels of expression than a regular alphanumeric flat identity. Because the three-dimensional shape nuggets have more positioning possibilities and more combinations than text does, one would have more freedom to assign visual attributes more quickly while still constructing an alphanumeric entity, as the sub shapes, and shape nuggets can always be expressed mathematically thus flattened for machine and computer use and three-dimensionalized for human visual and touch use as well as computer touch as in a graphical user interface, human to computer. FIGS. 16-18 show examples of this.

This shape can be used as a "seed identity" and can be used in different multidimensional formats and environments including video games. With this identity the user can pass from one game to another while maintaining a constant identity that can be a locator through many different programs.

Identification

Every person in the world could have a unique identification code, allowing for national and/or international identification including state identifications, driving licenses, passports. It can be used for private sector membership and identification cards; access cards for hotel and corporate facilities and high-security locations. Specifically, by constructing a shape nugget by computer interface and registering a shape nugget that's assigned to an individual at an online registrar of shape nuggets, one can use a unique shape nugget as an entity with other programs that will recognize and use its information as distinct thus to classify its ownership as it relates to the program it is being computed in. In other words, the shape nugget can be a form of identification that can be both uniquely identified as such as well as the shape nugget construction being chosen to further identify types of identities and information about the individual identity as it relates to the shape nugget identity Passwords/Passcodes Passwords and marks based on alphanumeric are limited by the number of characters used in the authentication process and the number of characters that an individual can remember. Once all of the alphanumeric characters are in play, the only way to strengthen the passcode or mark is to add additional characters. Using the shape-matrix for this allows for far greater variables through the shape combinations that can be visually represented in a much smaller physical space than the traditional alphanumeric passcodes and marks. Potential uses include individuals or computers creating passcodes as either shape nuggets using a graphical user interface or as complex markings to generate a strip of shapes based on a programmable variation ("Shape Strips"), printing the strip onto an item being tracked and stored in a database, and using a reader to read the strip of shapes that sends the information back to the database.

Education

As but one example, an art/education project could be developed that would be a comprehensive curricular package designed for the K-12 education market to provide a 21st century mathematics and visual art manipulative that can meet both so-called STEM and art state and national objectives through a critically designed curriculum whose center piece is the shape-matrix itself. A kit marketed for this purpose could be a complete curriculum module with manipulative, mini-lessons, activities, grade level specific web site, and professional development. The kits could be differentiated across ranges of grade levels such as K-2, 3-5, 6-8, 9-12, and could be used to supplement existing math/art curricula in an arts integrated approach. Concepts in geometry, shape, color, perspective, and symmetry can be taught and learned through shape-matrix block play.

Games

There are multiple applications to games, including dice-rolling games and shape-building games. One simple game is for a user to figure out how to arrange and orient the building blocks so as to create a specified shape nugget at the shape-matrix vertex. The specified shape nugget might be one of the mother shapes or it might be one chosen from pictures of random shape nuggets contained in a book sold with a set of shape-matrix blocks. FIG. 6 shows an example of a random such shape nugget. With two sets of shape-matrix blocks, two users might play a game wherein one of them creates a random shape-nugget with one set and the other user has to replicate that shape nugget using the second set. A time limit to accomplish this task might be set.

In various game and non-game applications, one might electronically determine the orientation and location on a tabletop, say, of each of a set of cubes. This might be accomplished by embedding within each cube circuitry that identifies the cube's orientation and that uses Bluetooth, for example, or some other protocol to communicate the location and orientation to a local receiver. Alternatively, a camera-like device on a stand, for example, might use image recognition technology to identify the location and orientation of the various cubes. In either case, information identifying the location and orientation of the various cubes can be communicated from a receiver of that information to a local or remote computer, smartphone or any other device having a display screen. Virtual representations of the cubes can be shown on a screen, such as in various embodiments disclosed herein, with the cubes' locations and orientations being the same as those of the physical cubes and, of course, with their locations and orientations changing as those of the physical cubes are changed. One can envision numerous possible games or educational programs that could use this capability.

Casino Gaming

Casino gaming involving the shape-matrix could include various forms of roulette, dice casino gaming similar to craps, a multi-dimensional Mahjong style game; three-dimensional slot machines where one could create a three-dimensional shape combination to win; or a lottery. In the latter, a computer interface would one to select a three-dimensional shape picking eight random numbers between 1 and 4096 and at the end of the period the cubes are rolled and combined and if someone's shape appears then there is a winner.

Thus, picture a display screen at a casino as being the shape matrix game site. By downloading an application for one's smartphone or by directly manipulating an interface, like a modern slot machine or ATM, one could use a graphical user interface or touch screen to choose a shape nugget. On the game screen or display, 512 cubes, as an example, could be seen floating and spinning free. Once one or more choices of shape nuggets are selected and entered as possible outcomes, the cubes on the game screen quickly form a large supercube set comprised of all 512 randomly positioned cubes bringing a random set of shape nuggets together in its vertices every time all 512 cubes or virtual shape dice are rolled. If a player or one who chose a shape nugget has chosen a shape nugget that then appears or matches one of the randomly generated shape nuggets in the supercube, then that player wins. If the player chooses a shape closer to the center, then more points are possible as a choice of shape nugget that exactly matches the shape nugget in the dead center of the supercube would essentially win a three-dimensional bull's-eye or jackpot.

Music, Visual Entertainment and Art

The music applications are extensive as well. For example, a computer application can be created that links the animations, rotation and manipulation of the shape matrix and/or its components dependent on specific notes from specific instruments. This could enable one to play with the shape-matrix through a digital interface by connecting to a real time input such as a microphone, electronic instrument, etc.

Language

The shape-matrix can be the basis of a new three-dimensional shape language that can be manifested in many ways using existing technologies.

For example, a book can be published giving definitions to shape combinations that humans use. (Example: Black Sphere=Death, White Sphere=Life, and any combination in between can be a measure of a persons health.) A social media program could be created wherein, instead of text being used, people could send shapes to one another, creating a personal meaning that is only significant to the connected parties. Specifically, one could select any shape and or corner shape and send that shape or combination of shapes to others to represent a code with a specific meaning. This creates an untraceable communication between two or more people.

General Math and Physics

Elements of and connections with mathematics, classical physics, quantum physics, quantum mechanics can be explored, visualized and manipulated through a fully manipulatable program that could allow a user to give significance to shapes entering the matrix, examples being speed, density, chemical makeups, etc.) Thus the shapes can be signals of all kinds of information. Once the corner shapes populate the matrix in a sequence, the population sequence can be analyzed in multiple dimensions. And then once the data is analyzed the data set can then be re-set to form a new scenario for evaluation. Such an approach can be used to explore theories stemming from the work of such scientists as Einstein, Pauli, Dirac, Schrodinger, Plank, Born, Bohr, De Broglie, Heisenberg, Hilbert, and Bohm. In the Shape Matrix Geometric Instrument one can easily express simplistically, by organized movements of corner shapes and shape nuggets and the control of cube placement, as an expression of energy. And thus, as Herman Helmholtz stated: "Whenever a certain amount of energy disappears in one place, an equivalent amount must appear elsewhere in the same system. This is the Law of the Conservation of Energy. It is a pillar of modern physics and is unchanged by modern theories such as those put forth by the scientists and physicists mentioned above.

In addition, as indicated in the website Wikipedia, the Law of Conservation of Mass—otherwise referred to as the Principle of Mass Conservation—states that for any system closed to all transfers of matter and energy (both of which have mass), the mass of the system must remain constant over time, as system mass cannot change quantity if it is not added or removed. Hence, the quantity of mass is "conserved" over time. The law implies that mass can neither be created nor destroyed, although it may be rearranged in space, or the entities associated with it may be changed in form, as for example when light or physical work is transformed into particles that contribute the same mass to the system as the light or work had contributed. The law implies (requires) that during any chemical reaction, nuclear reaction, or radioactive decay in an isolated system, the total mass of the reactants or starting materials must be equal to the mass of the products.

Thus it is seen that the Shape Matrix Geometric Instrument can manifest an arrangement of shapes based on data sets related to all kinds of scientific information. Shape-matrix geometric instrument expressions are equivalent to a data set that may control the possible movement of the geometric instrument pieces (blocks, cubes, supercubes, corner shapes) and their location, in relation to each other and the shape-matrix grid that the units exist in. The shape-matrix geometric instrument has congruent formal functions to that of the modern sciences and can execute functions like rotation, diagonal and rectilinear progression, appearance, disappearance and the speed at which this occurs, plus other variables extracted from the shape-matrix geometric instrument's base characteristics and mathematical possibilities. Modern science, for instance uses, in its notation of space and light, matter and time, many symbols and alphanumeric expressions. Now, through the shape-matrix geometric instrument, one can see another kind of mathematical or geometrical expression manifesting in groups of shape and cube combinations within a grid. Many expressions of data sets tracking this kind of basic scientific parametric data or other points of data with different meaning is valuable because the data then has another identity which can be catalogued and observed and compared amongst other manifested data sets or geometric instrument expression, shape sets, etc. The shape-matrix geometric instrument can be understood to function as creating distinct expressions in its formation based on the intent of its basic units or parts manipulation in two and three-dimensional space. In other words, one can use it to visualize data in a new or a different way—with shapes—not unlike our own brains do.

Data Visualization (Analysis, Representation)

There are a number of problems with the way data and information is currently communicated or visualized. Information that is communicated aurally takes time to communicate and also has the capacity to be intercepted and translated. Scrambling audio communications requires computing capacity. Additionally, information that is communicated visually is limited by the space within which it can be displayed. Lastly, the more variables that are being monitored, the harder it is for someone to see the information changing in real time. By using the shape-matrix, one can devise systems that can allow for monitoring and tracking an extremely large number of variables as represented by shape combinations in the form of shape nuggets or shape strips. The variables can be tracked and viewed in real time and historically by individuals or by programs. Indeed, using concepts from physics and math one can put almost any kind of data into the system and simultaneously record, say, 4096 signals at one time. Previous data sequences can be monitoring and inspected. This can be a very helpful tool for analyzing financial markets, social data and many other forms of scientific data.

Neurophysics

The Shape-Matrix Geometrical Instrument could be a useful tool in neurophysics for the presentation of the visual environment to a human subject. By using functional brain imaging techniques and by modifying the visual input to the human brain by slightly changing the parameters of the displayed shape-matrix and/or its components, including a shape nugget, such an application could facilitate and expand the understanding of detailed human brain function. The modifications could happen at a $1^{st}$ level to move and float individual macro-quantal spheres or they could further be happening at a more detailed $2^{nd}$ level, by modifying individual corner shapes within those shape nuggets and mix them within the context of the other shape nuggets.

Additionally, the shape-matrix geometric instrument considered at large, has further potentials as a multi-dimensional tool for facilitating the visualization of five-dimensional human brain imaging data of the detailed structural-, functional-, and dynamic brain network connectivity in health and disease; visualized across three-dimensional structure, frequency and time, and further multidimensionally including the cognitive and pathological alterations in five-dimensional and multi-relations to the various clinical symptoms in cognitive disabilities, neurology and psychiatry.

Imaging

The shape-matrix could be manipulated by a super computer and perhaps produce an output of a high definition three-dimensional image similar to holographic image, but more manipulatable and without the use of mirrors.

Other Fields

No doubt other uses for the Shape-Matrix Geometric Instrument can be developed over time. Among the possible areas of exploration are genetics, chemistry, biochemistry and pharmaceuticals.

Smartphone Implementation

Figure 19B:
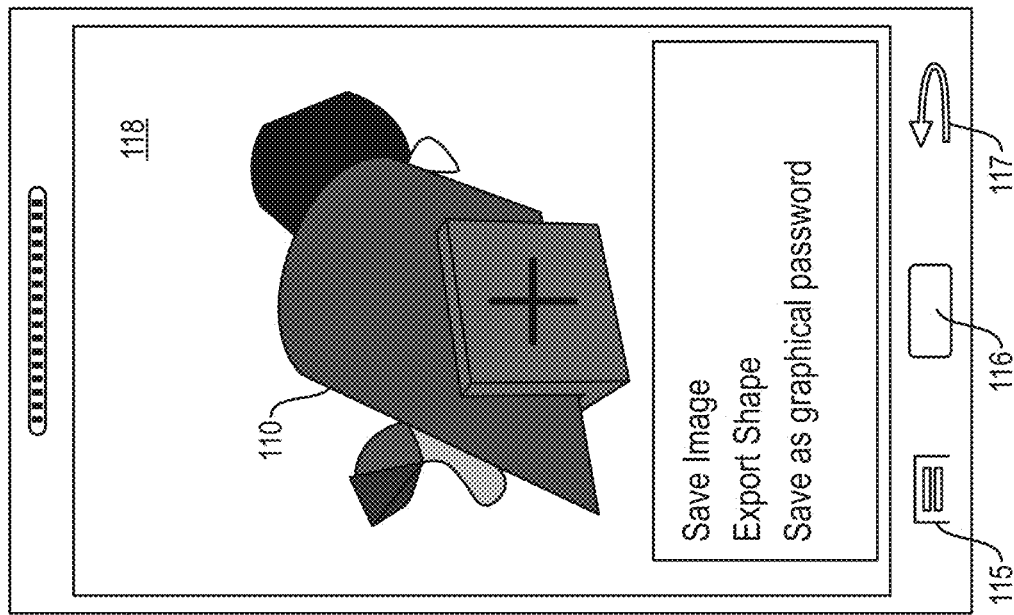
FIGS. 19A and 19B show a shape-matrix geometric instrument implemented on a smartphone.
Figure 19A:
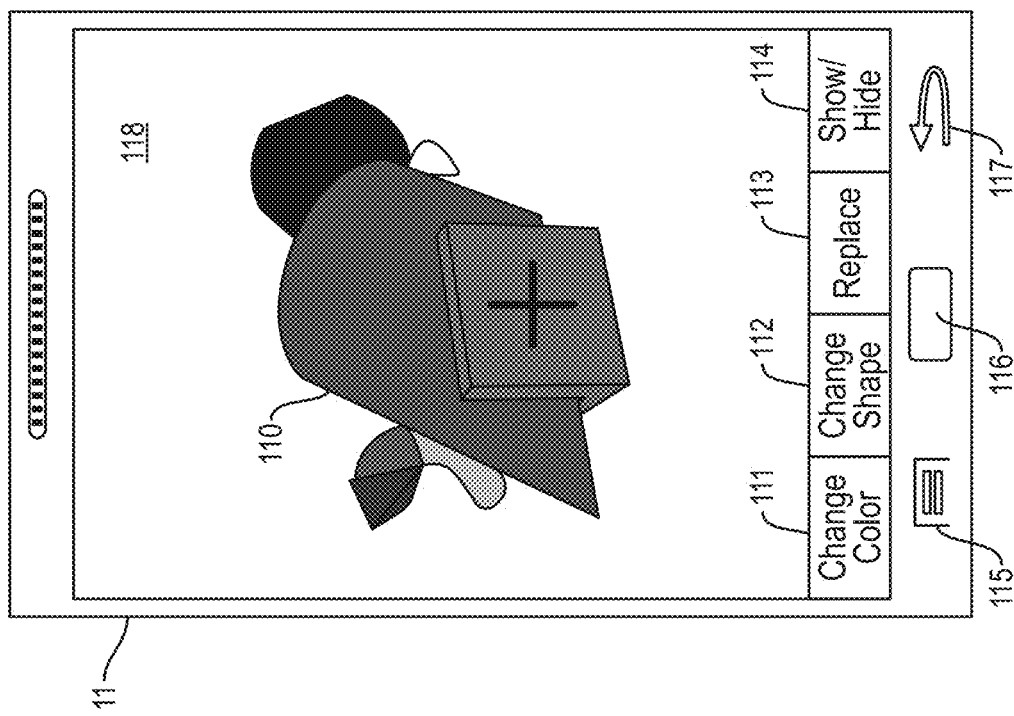

FIGS. 19A and 19B show a shape-matrix geometric instrument implemented by an app running on a smartphone 11, the smartphone having a screen 118, a main select button 116, menu button 115 and back button 117. In a simple use, the app may be used as a pastime wherein a user can manipulate the shape-matrix simply for his/her own amusement.

Referring to FIG. 19A, the app is displaying a shape nugget 110. Using finger gestures, a user can cause the shape nugget to rotate in the x-y (horizontal) plane and in the y-z (vertical) plane. Also using finger gestures, a user can zoom in or out. And also using finger gestures, a user can "select" a particular corner shape, responsive to which, the app will somehow denote the corner shape selected. In this example, the app places a cross-hairs symbol in the selected shape, illustratively the green corner shape. Any desired way of denoting which is the selected corner shape can be used, however, such as some form of distinctive illumination or highlighting of the selected corner shape. Various soft buttons are displayed on the screen. Successive user touches of "change color" button 111, causes the color of the selected corner shape to cycle through a sequence of color changes. With each touch of "change shape" button 112, the user causes the building block associated with the selected shape to rotate to another one of its various possible orientations, thereby causing a different corner shape from that building block to take the place of the selected corner shape. The cross-hairs symbol will appear in each corner shape thus rotated into the shape nugget.

In particular embodiments, the cycle will repeat for the selected corner shape if the user continues to touch "change shape" button 112. In that scenario, a user would use a finger gesture to select a different corner shape of the shape nugget if desiring to deal with that different corner shape. In other embodiments, once all the different orientations of the building block associated with the selected shape have been gone through, the app might automatically proceed to a different shape of the shape nugget and then cycle through the orientations of the building block associated with that different shape, and so forth through all the shapes of the shape nugget. By touching "Replace" button 113, the user causes the corner shape most recently rotated into the position associated with the selected corner button to become the new permanent corner shape for that position (although it obviously can again be changed later by going through the same steps) and the crosshair symbol would disappear at that point. "Show/Hide" button 114 is a toggle button that causes the displayed image to toggle between a shape-nugget-only view, such that that depicted in FIG. 19A, to a view that shows some or all of the rest of the shape-matrix including corner shapes not currently in the shape nugget and lines demarcating the building blocks, such as is seen in FIGS. 9 and 10. The user can zoom in or out to see as much of the shape-matrix as the user may desire. The app illustratively does an implicit "save" so that when the user reopens the app after having closed it, the shape-matrix will be in the configuration that it had when the user had closed it.

In other implementations, the app may be configured in such a way that various functions described herein as being performed by soft buttons might, in stead, be able to be performed by various finger gestures.

The user touching menu button 115 brings up a menu as shown in FIG. 19B. The user choosing the menu option "Save Image" will be prompted as to where the app should store a jpg or other picture-format image of the shape nugget depicted in perspective view on screen 118, such as within a local folder of the phone, to its clipboard, a cloud-based file storage service, etc. "Export shape" exports not a simple image of the shape nugget but, rather, a code or data structure that defines the entire shape-matrix of which it is a part, with the building blocks having been rotated to the positions that resulted in the shape nugget depicted. Other apps or computer programs that receive the exported data structure will then be able to represent the shape nugget or the entire shape-matrix of which it is a part in a manner that would allow a user of that such other apps or programs to manipulate and/or change the shape-matrix. The initial configuration of the shape-matrix in that case will be the one that resulted from whatever manipulations had performed by the smartphone app user as described above up to the point in time of the export. That is, when the shape-matrix is first displayed in such other apps or computers programs, its shape nugget will be as it was at the time of export. Specific export choices that a user may be presented with might include vector-based three-dimensional file in a format such as .kmz, .obj or .skp. Such other apps or programs might, furthermore, allow a user to create new shape-matrices by substituting new corner shapes into the shape-matrix by, for example, defining the corner shapes individually or by defining the properties and positions of a new mother shape. Such other apps or programs might, alternatively, allow a user to define a new shape-matrix grid and build up a shape-matrix based on that grid with mother shapes and/or individual corner shapes that the user could select from a library, say, or might create on his/her own.

"Save as graphical password" is essentially a special case of export wherein the shape-matrix in its current configuration—i.e. with the shape nugget being the one currently displayed—being made available to a program installed in the smartphone that provides the smartphone with an unlocking functionality. In particular, selecting the "Save as graphical password" option causes the shape nugget then being displayed to be available to be used as a password in place of the conventional numerical password entered on a keypad. A user will have indicated in one of the smartphone's "settings" menus that the user desires this form of passwording for the smartphone. In operation, the user is presented with a shape nugget of the exported shape-matrix. It will be a different one of the shape-matrix's shape nugget than the one that was saved as the graphical password. In order to unlock the smartphone, the user will then manipulate the displayed shape nugget using finger gestures and/or soft buttons in a manner similar to that described above so as to cause the displayed shape nugget to be the one that the user has memorized as being as the graphical password. The user will then press the smartphone's main select button 116 or perhaps a displayed soft button to unlock the phone. Of course, the phone will unlock only if the shape nugget that the user has caused to be displayed is the shape nugget that was saved as the graphical password. In particular embodiments, the shape nugget that is first displayed is always the same. The user thus quickly learns the particular sequence of gestures and/or touches that transform the display shape nugget to the particular one that serves as the graphical password.

Such a graphical password functionality can be implemented in virtually any passwording/access context where a display screen is available. Thus this functionality can be generally characterized as being a functionality or step wherein a user-indicated one of the shape nuggets is compared to a previously stored one of the shape nuggets and access is provided to a resource—such as the functionality of a smartphone or computer or physical space, and/or a user's identity is confirmed—when the those two shape nuggets are the same.

Software Architecture

Those skilled in the art will be able to implement various shape-matrix geometric instruments using standard available graphics software tools and conventional programming skills based on the description presented hereinabove. By way of example, the following describes a straightforward software architecture for the shape-matrix geometric instrument described above in connection with FIGS. 19A and 19B as might be implemented in a smartphone that uses the iOS operating system employed in a line of smartphones designed and marketed by Apple Inc as the iPhone.

The app could be written in the C++ programming language using the Open Source graphics library called openFrameworks and distributed under the MIT License. It is assumed for these purposes that the designer has already decided upon a particular set of mother shapes or individual corner shapes and these will be fixed and not changeable by a user, although the user will be able to change, for example, shape colors and textures. In other embodiments the user may be provided with further tools that enable the user to define all aspects of a shape-matrix to be constructed.

The building blocks of the shape matrix are loaded into the app as three-dimensional models, or "meshes" with an Open Source library called Assimp Model Loader. More particularly, the corner shapes can be "described" to the shape-matrix geometric instrument (app) using CAD descriptions of the shapes and (illustratively) a five-digit code (A, B, C, D, E).

One would first define a number of mother shapes—in this example eight mother shapes—using CAD software such as those marketed under the tradenames AutoCAD, SketchUp and Rhino. Then assign to each mother shape a numerical identifier (A) identifying that particular mother shape within the universe of eight mother shapes. The mother-shape identifiers may be, for example, the digits 1 through 8.

Deconstruct each mother shape into its (in this example) eight corner shapes, these being referred to as "meshes," using, for example, the openFrameworks Open Source tool to create a matrix expression of xyz coordinates in space defining each corner shape. Assign to each corner shape of each mother shape a numerical identifier (B) identifying that particular corner shape within the universe of eight corner shapes of its particular mother shape. The corner shape identifiers may, again, be, for example, the digits 1 through 8.

Then assign to each corner shape a numerical identifier (C) identifying its color from among a predefined universe of, illustratively, ten or fewer colors, so that the color can be identified by a single digit from 0 through 9. Also assign to each corner shape a numerical identifier (D) identifying which of the building block corners that are coincident with the shape-matrix that corner shape falls into, given an assumed orientation of the mother shape, these identifiers again illustratively being the digits 1 through 8.

Finally, assign to each corner shape a numerical identifier (E) identifying how that corner shape is oriented within its respective corner. In particular, there are three sides to all corner shapes and this identifier identifies which side of the corner shape touches the x-plane of the shape-matrix grid. This identifier has one of the values 1, 2 and 3, wherein 1 means that the x side of the corner shape is touching the x plane of the grid; 2 means that the y side of the corner shape is touching the x plane of the grid; and 3 means that the z side of the corner shape is touching the x plane of the grid.

Further variations are possible. The various numerical identifiers could be multi-digit identifiers if more than then alternatives for a given parameter need to be accommodated, such as for example when larger shape-matrices are used and/or such as or to allow for more than ten colors. In addition, further numerical codes can be defined that could indicate, for example, a particular orientation of each corner shape within its building block corner.

Based on the foregoing, one can readily write software that performs the functionalities of the app. The software may be written, for example, in C++ and may invoke various additional Open Source libraries, as will be apparent to those skilled in the art—for example, the openFrameworkstoolkit.

Various implementations may include further components of the software architecture as will be apparent to those skilled in the art.

Further Observations

Not all possible applications of the shape-matrix geometric instrument are as yet known. It remains to discover new and unexpected ways of utilizing the shape-matrix geometric instrument to further our understanding of the universe and how it functions.

The shape-matrix geometric instrument provides a way to see how pure and applied mathematical input data effects the formation, position, and movement of any shape within a three-dimensional grid. In this way it can serve as a tool to help us visualize how the distribution of space, time, velocity, energy, and matter relate to human perception.

In the shape-matrix one can see the past, present, and future from any angle, within the context of a corner shape passing through the matrix, in the case of a animated version of the shape-matrix geometric instrument. This is a limiting framework, but thankfully so, as one's vast unexplained brain contextualizes one's consciousness and its movements in its own controlled way. "If I only had eyes in the back of my head" typifies a desire to increase awareness or see more of one's environment. Rearview mirrors do this to some extent, giving us a frame of visual information (data) as we leave it behind. The shape-matrix geometric instrument controls the environment so we can experience an object moving through space-time from many different perspectives via automation and animation. Within the three-dimensional grid model, it is possible to interact with a system from various angles and viewpoints while it is functioning.

Now add to this the idea of angle, movement, and perception of the viewer. Human vision is a communicated scope enabled by the visible light in the electromagnetic spectrum. We can see distances (vanishing points) from the center of our vision and this provides the radius of our vision specific to our visual center (view point). Based on this distance we can, environment permitting, describe our vision in radial/hemispherical if not spherical scope.

As soon one moves one's viewpoint, one's scope also moves, or one's visual range shifts relative to one's position. If that position is a point on a grid the movement of one's visual scope can be tracked relative to its location on that grid. As a person moves up, down, or around, the way s/he perceives the shape-matrix changes, giving still new and constantly changing animation to the shapes within.

In this sense it is possible to observe animation of the system even in a "freeze frame" mode, viewing a single moment in the movement of the system from many perspectives. It could be argued, then, that in viewing an event in this fashion we are examining different manifestations of reality which sprout from a single moment in space and time. Each "point of view" is an alternate version of the unfolding event. This could be applied to the behavior of sub-atomic particles, which are known to exist in two places at once and boggle our comprehension of probability.

The complexity of the visualized data can be controlled as well. The shape-matrix can have variables assigned to it that coincide with the movement of the human body or even music. Observable shapes have a physical radius from their center point to their farthest physical point. For instance a car's radius would be in the middle of its interior cabin to its hood ornament or rear bumper.

All observable shapes also define a sphere depending on their possibilities of rotation. For example, if this or any shape were rotated 360 degrees in every direction, center point being fixed on its axis, its farthest point would describe its circumference.

In computing and geometric modeling, shapes (spheres) in an infinite symmetrical matrix can become powerful tools. When spheres are used to illustrate possibilities of structures and their movements as they break apart and re-form, they define a space where any shape with a radius equal to or less than the sphere can exist.

Valuable studies based on speed of perception can be controlled. Perceptual scope from any given point in the matrix can be identified because in the computer the matrix is controlled by a modulator or data interface. When the visual interface (computer to human) is expanded into a virtual reality dome or cave structure the possibilities of perceptual studies increase with the expansion of the controlled environment.

By the ability to track and freeze for inspection the location and path of moving values and quantities as they exist in the greater area of the matrix one can observe the fixed model at all view points. It is then possible to systematically augment levels of change based on various types of input data, thus allowing us to track the viewer while the viewer is tracking what they see (which is also a constantly changing variation of the whole).

Myriad data can be visualized in the context of the shape-matrix. One can assign variables that control the shapes and matrices. The shape-matrix can be manipulated with computer programs to simulate interactions dealing with, velocity, color, transparency, viscosity, density, temperature and combinations thereof.

CONCLUSION

The foregoing merely illustrates the principles of the invention. Thus, for example, although the polytopes used as building blocks in the disclosed embodiments are squares and cubes, a shape-matrix geometric instrument can be based on any tessellatable polytope such as, in two-dimensional space, squares, equilateral triangles and hexagons and such as, in three-dimensional space, cubes, tetrahedrons, hexagonal prisms, rhombic dodecahedrons and truncated octahedrons.

Although certain shapes are shown herein as mother shapes, any desired shape can be used, including real-world objects. For example, a mother shape could have the form and finish of an automobile or any other desired real-world object.

It will thus be appreciated that those skilled in the art will be able devise various alternative arrangements, methods and structures that, while not explicitly disclosed herein, embody the principles of the invention and thus will be within their spirit and scope.

What is claimed:

1. A system of physical objects, wherein each particular physical object in the system includes a particular two-dimensional physical pattern, which particular pattern:
   (a) is different from any two-dimensional physical pattern that is included in any other physical object in the system; and
   (b) includes multiple two-dimensional portions, each two-dimensional portion having an outline that matches, in geometric shape, an outline of a component of a shape-matrix, which shape-matrix comprises a set of three-dimensional building blocks, each particular building block in the set including three-dimensional corner shapes, which corner shapes are located in respective three-dimensional corner spaces of the particular block in such a way that each corner shape in the particular block (i) touches a vertex of the particular block and (ii) fills a three-dimensional volume that is in the interior of the particular block.

2. The system of claim 1, wherein the particular physical pattern uniquely identifies the particular physical object.

3. The system of claim 1, wherein the particular two-dimensional physical pattern is a pattern of solid matter of the particular physical object.

4. The system of claim 1, wherein the corner shapes include at least one corner shape that is a portion of a mother shape, which mother shape is a torus, cone, ovoid or cylinder.

5. A system of three-dimensional physical objects, wherein, for each particular physical object in the system:
   (a) the particular physical object includes a particular two-dimensional physical pattern that identifies the particular physical object;
   (b) the particular two-dimensional physical pattern includes a set of two-dimensional components;
   (c) the two-dimensional components depict three-dimensional corner shapes of a shape matrix in such a way that each two-dimensional component in the set of components depicts a three-dimensional corner shape of the shape matrix;
   (d) the shape matrix comprises a group of three-dimensional building blocks; and
   (e) three-dimensional corner shapes of each particular building block in the shape matrix are located in respective three-dimensional corner spaces of the particular block in such a way that each corner shape in the particular block (i) touches a vertex of the particular block; and (ii) fills a three-dimensional volume that is in the particular block.

6. The system of claim 5, wherein the particular two-dimensional physical pattern that is included in the particular physical object is different from any two-dimensional physical pattern that is included in any other physical object in the system.

7. The system of claim 5, wherein the particular physical pattern uniquely identifies the particular physical object.

8. A system of three-dimensional physical objects, wherein, for each particular physical object in the system:
   (a) the particular physical object includes a particular two-dimensional physical pattern that identifies the particular physical object;
   (b) the particular two-dimensional physical pattern includes a set of two-dimensional components;
   (c) the two-dimensional components match three-dimensional corner shapes of a shape matrix in such a way that an outline of each two-dimensional component in the set of components has a geometric shape that matches a geometric shape of an outline of a three-dimensional corner shape of the shape matrix;
   (d) the shape matrix comprises a group of three-dimensional building blocks; and
   (e) three-dimensional corner shapes of each particular building block in the shape matrix are located in respective three-dimensional corner spaces of the particular block in such a way that each corner shape in the particular block (i) touches a vertex of the particular block; and (ii) fills a three-dimensional volume that is in the particular block.

9. The system of claim 8, wherein at least one of the corner shapes differs in color from at least one other of the corner shapes.

10. The system of claim 8, wherein the particular two-dimensional physical pattern that is included in the particular physical object is different from any two-dimensional physical pattern that is included in any other physical object in the system.

11. The system of claim 8, wherein:
    (a) the physical objects comprise a set of currency bills; and
    (b) the two-dimensional physical patterns are disposed on respective currency bills in the set of currency bills.

12. The system of claim 8, wherein the corner shapes include at least one corner shape that is a portion of a mother shape, which mother shape is a torus, cone, ovoid or cylinder.

13. The system of claim 8, wherein the particular two-dimensional physical pattern is not formed by an electronic display screen.

14. The system of claim 8, wherein the particular two-dimensional physical pattern that is included in the particular physical object is a pattern of solid matter of the particular physical object.

15. The system of claim 8, wherein the corner shapes include corner shapes that meet at a common vertex in the shape matrix.

16. The system of claim 8, wherein:
    (a) each two-dimensional component in a first subset of the two-dimensional components has an outline that matches, in geometric shape, an outline of a shape corner as seen from a first side of the shape matrix; and
    (b) each two-dimensional component in a second subset of the two-dimensional components has an outline that matches, in geometric shape, an outline of a shape corner as seen from a second side of the shape matrix.

17. A method of identifying a particular physical object by detecting a particular two-dimensional physical pattern that is present in and that identifies the particular physical object, wherein:
    (a) the particular two-dimensional physical pattern includes a set of two-dimensional components;
    (b) the two-dimensional components depict three-dimensional corner shapes of a shape matrix in such a way that each two-dimensional component in the set of components depicts a three-dimensional corner shape of the shape matrix;
    (c) the shape matrix comprises a group of three-dimensional building blocks; and
    (d) three-dimensional corner shapes of each particular building block in the shape matrix are located in respective three-dimensional corner spaces of the particular block in such a way that each corner shape in the particular block (i) touches a vertex of the particular block; and (ii) fills a three-dimensional volume that is in the particular block.

18. A method of identifying a particular physical object by detecting a particular two-dimensional physical pattern that is present in and that identifies the particular physical object, wherein:
  (a) the particular two-dimensional physical pattern includes a set of two-dimensional components;
  (b) the two-dimensional components match three-dimensional corner shapes of a shape matrix in such a way that an outline of each two-dimensional component in the set of components has a geometric shape that matches a geometric shape of an outline of a three-dimensional corner shape of the shape matrix;
  (c) the shape matrix comprises a group of three-dimensional building blocks; and
  (d) three-dimensional corner shapes of each particular building block in the shape matrix are located in respective three-dimensional corner spaces of the particular block in such a way that each corner shape in the particular block (i) touches a vertex of the particular block; and (ii) fills a three-dimensional volume that is in the particular block.

19. The method of claim 18, wherein the identifying includes tracking the particular physical object based on the particular two-dimensional physical pattern.

20. The method of claim 18, wherein the particular physical object is a currency bill.

21. The method of claim 18, wherein:
  (a) each two-dimensional component in a first subset of the two-dimensional components has an outline that matches, in geometric shape, an outline of a shape corner as seen from a first side of the shape matrix; and
  (b) each two-dimensional component in a second subset of the two-dimensional components has an outline that matches, in geometric shape, an outline of a shape corner as seen from a second side of the shape matrix.

22. The method of claim 18, wherein different components in the set of components have different geometric shapes.

23. The method of claim 18, wherein the particular two-dimensional physical pattern that is included in the particular physical object is a pattern of solid matter of the particular physical object.

* * * * *